(12) United States Patent
Iwasaki et al.

(10) Patent No.: US 10,340,511 B2
(45) Date of Patent: Jul. 2, 2019

(54) ELECTRODE, NONAQUEOUS ELECTROLYTE BATTERY, BATTERY PACK AND VEHICLE

(71) Applicant: KABUSHIKI KAISHA TOSHIBA, Minato-ku (JP)

(72) Inventors: Takuya Iwasaki, Uenohara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 92 days.

(21) Appl. No.: 15/455,797

(22) Filed: Mar. 10, 2017

(65) Prior Publication Data

US 2018/0083269 A1 Mar. 22, 2018

(30) Foreign Application Priority Data

Sep. 20, 2016 (JP) .................. 2016-183333

(51) Int. Cl.
*H01M 4/36* (2006.01)
*H01M 10/42* (2006.01)
(Continued)

(52) U.S. Cl.
CPC ........... *H01M 4/364* (2013.01); *H01M 4/131* (2013.01); *H01M 4/485* (2013.01); *H01M 4/505* (2013.01); *H01M 4/525* (2013.01); *H01M 4/5825* (2013.01); *H01M 4/62* (2013.01); *H01M 4/628* (2013.01); *H01M 10/425* (2013.01); *H01M 4/366* (2013.01); *H01M 4/483* (2013.01); *H01M 10/0525* (2013.01); *H01M 2220/20* (2013.01); *Y02E 60/122* (2013.01)

(58) Field of Classification Search
None
See application file for complete search history.

(56) References Cited

U.S. PATENT DOCUMENTS

2006/0251965 A1  11/2006  Nagayama et al.
2008/0268346 A1  10/2008  Inda
(Continued)

FOREIGN PATENT DOCUMENTS

JP    3-15165    1/1991
JP    9-27343    1/1997
(Continued)

OTHER PUBLICATIONS

Extended European Search Report dated Jun. 22, 2017 in Patent Application No. 17159336.1.

*Primary Examiner* — Scott J. Chmielecki
(74) *Attorney, Agent, or Firm* — Oblon, McClelland, Maier & Neustadt, L.L.P.

(57) ABSTRACT

According to one embodiment, an electrode is provided. The electrode includes a current collector and an active material-containing layer. The active material-containing layer is provided on the current collector. The active material-containing layer includes active material particles and insulator particles. The active material-containing layer has a first surface facing the current collector and a second face as a surface of the active material-containing layer. The second face includes a surface of a part of the insulator particles. A volume ratio of the insulator particles decreases from the second face toward the first surface in the active material-containing layer.

19 Claims, 5 Drawing Sheets

(51) Int. Cl.
  *H01M 4/485* (2010.01)
  *H01M 4/505* (2010.01)
  *H01M 4/525* (2010.01)
  *H01M 4/58* (2010.01)
  *H01M 4/62* (2006.01)
  *H01M 4/131* (2010.01)
  *H01M 4/48* (2010.01)
  *H01M 10/0525* (2010.01)

(56) References Cited

U.S. PATENT DOCUMENTS

| | | | |
|---|---|---|---|
| 2009/0173632 A1 | 7/2009 | Nagayama et al. | |
| 2011/0033754 A1* | 2/2011 | Shimizu | H01M 2/1646 |
| | | | 429/231.95 |
| 2011/0274962 A1 | 11/2011 | Inagaki et al. | |
| 2013/0129914 A1 | 5/2013 | Nagayama et al. | |
| 2013/0177811 A1 | 7/2013 | Roffat et al. | |
| 2014/0079992 A1 | 3/2014 | Tanaka | |
| 2014/0255778 A1 | 9/2014 | Huh et al. | |
| 2015/0034149 A1* | 2/2015 | Sasaki | H01M 4/48 |
| | | | 136/252 |
| 2015/0086811 A1* | 3/2015 | Takami | H01M 4/485 |
| | | | 429/7 |
| 2015/0210232 A1* | 7/2015 | Kanzaki | B60R 16/033 |
| | | | 701/36 |
| 2015/0340741 A1 | 11/2015 | Kim et al. | |
| 2015/0380727 A1* | 12/2015 | Hao | H01M 4/366 |
| | | | 438/778 |
| 2016/0028079 A1* | 1/2016 | Allen | H01M 4/366 |
| | | | 438/778 |
| 2016/0149209 A1* | 5/2016 | Jeon | H01M 4/366 |
| | | | 429/217 |
| 2016/0149220 A1* | 5/2016 | Uhm | H01M 4/0452 |
| | | | 429/220 |
| 2016/0293957 A1* | 10/2016 | Okae | H01M 4/13 |
| 2016/0359197 A1* | 12/2016 | Watarai | H01M 10/0567 |
| 2016/0365604 A1* | 12/2016 | Mimura | H01M 10/0562 |
| 2017/0069907 A1* | 3/2017 | Zhu | H01M 4/0435 |
| 2017/0077551 A1* | 3/2017 | Kishi | H01M 10/0567 |
| 2017/0110760 A1* | 4/2017 | Hatta | B60L 58/14 |
| 2017/0309890 A1 | 10/2017 | Shin et al. | |
| 2018/0097223 A1* | 4/2018 | Saito | H01M 4/134 |

FOREIGN PATENT DOCUMENTS

| | | |
|---|---|---|
| JP | 11-162506 | 6/1999 |
| JP | 2002-334719 | 11/2002 |
| JP | 2005-276454 A | 10/2005 |
| JP | 2006-86102 | 3/2006 |
| JP | 4055671 | 3/2008 |
| JP | 2008-135287 | 6/2008 |
| JP | 2010-32349 | 2/2010 |
| JP | 2011-124028 | 6/2011 |
| JP | 2013-537356 | 9/2013 |
| JP | 2015-517189 | 6/2015 |
| JP | 2015-225855 | 12/2015 |
| KR | 10-2011-0094101 A | 8/2011 |
| KR | 10-2015-0062989 A | 6/2015 |
| KR | 10-2016-0039834 A | 4/2016 |
| WO | WO 2012/164642 A1 | 12/2012 |
| WO | WO 2016/129426 A1 | 8/2016 |

* cited by examiner

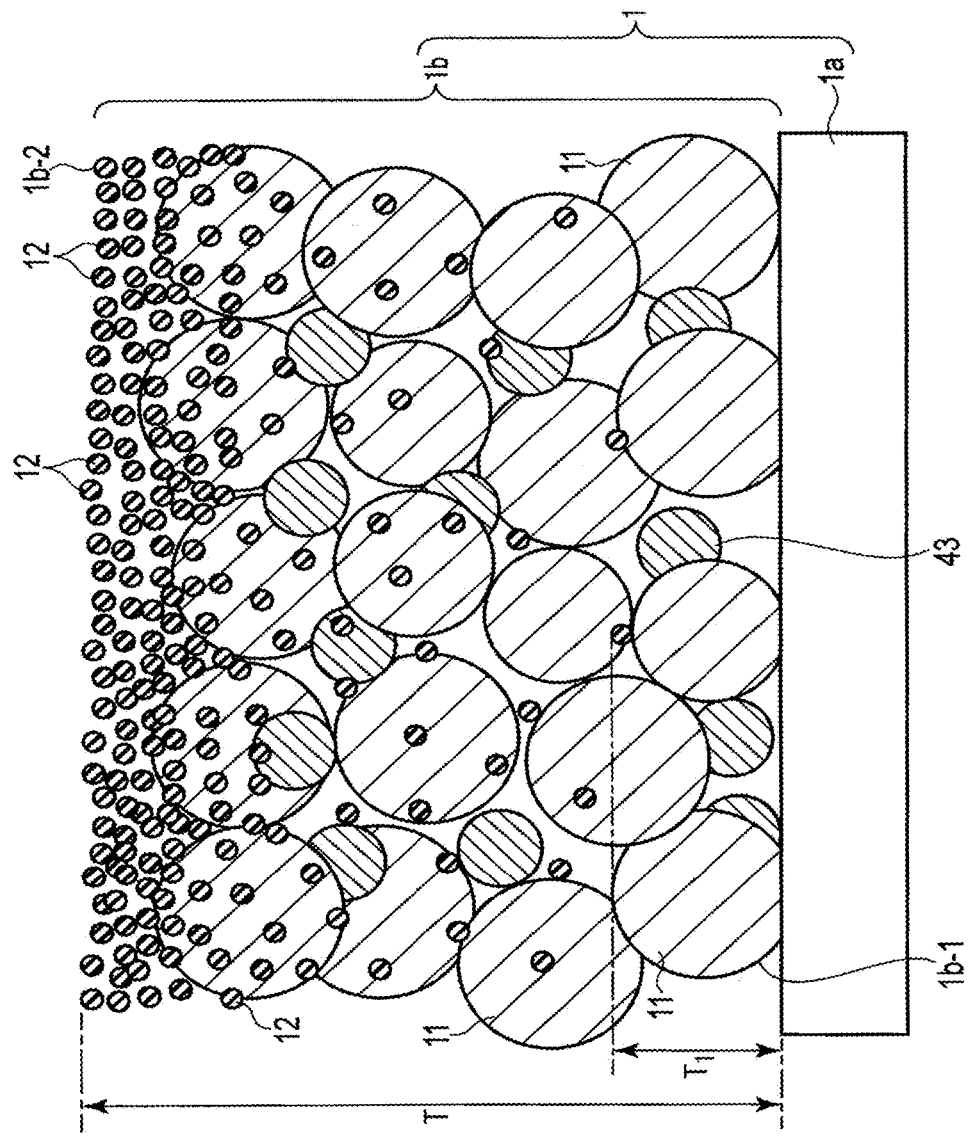
F I G. 1

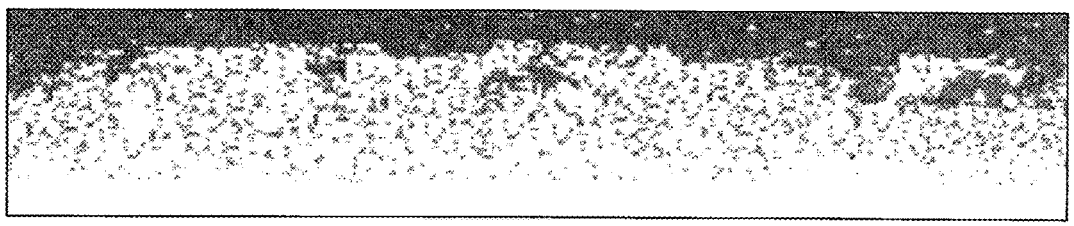
F I G. 2
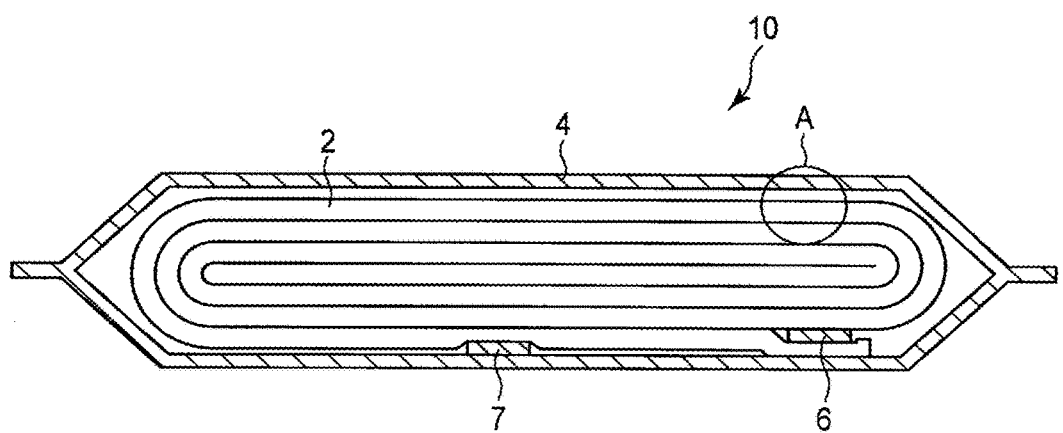
F I G. 3

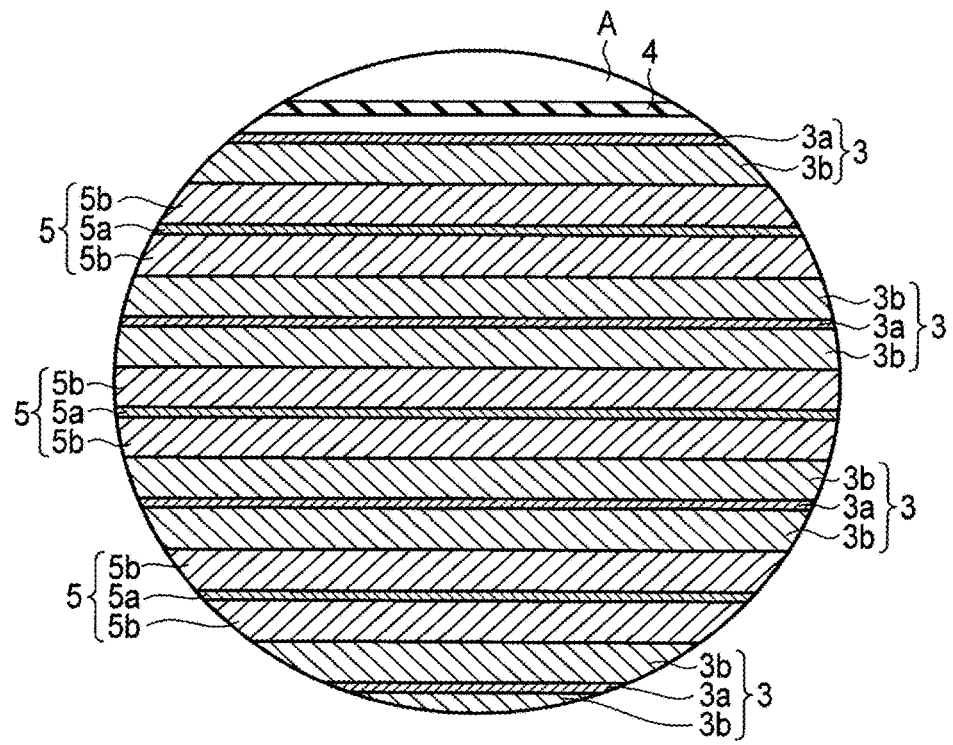
F I G. 4
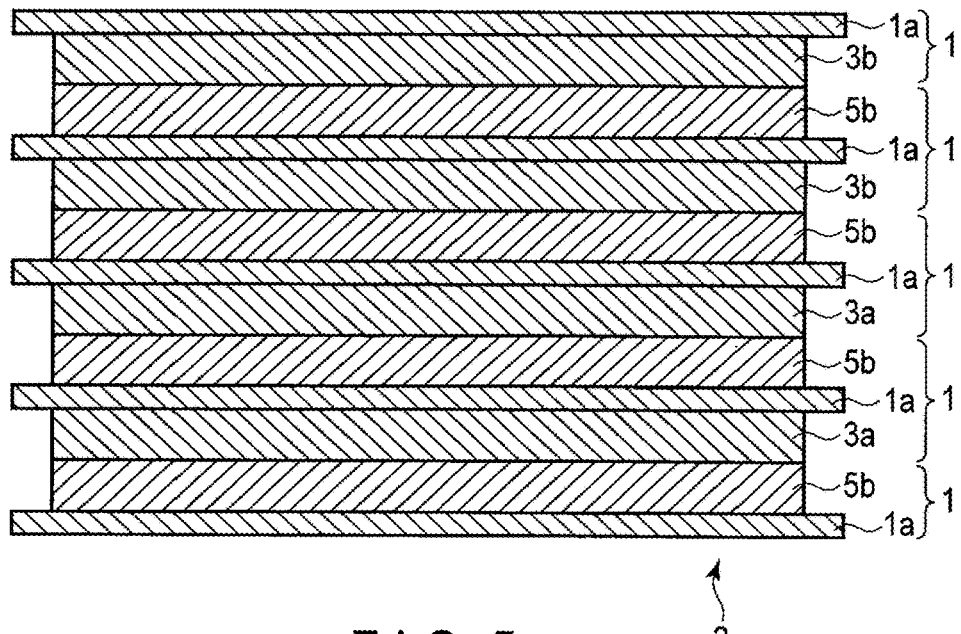
F I G. 5

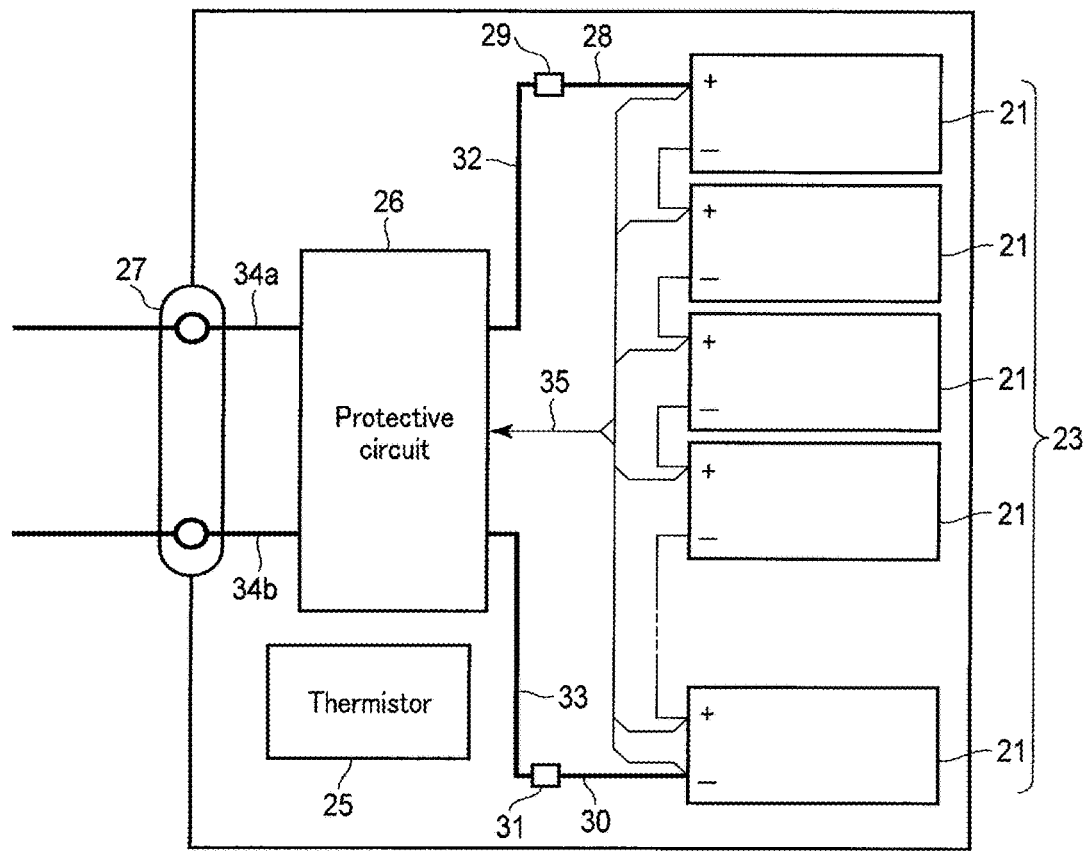
F I G. 7
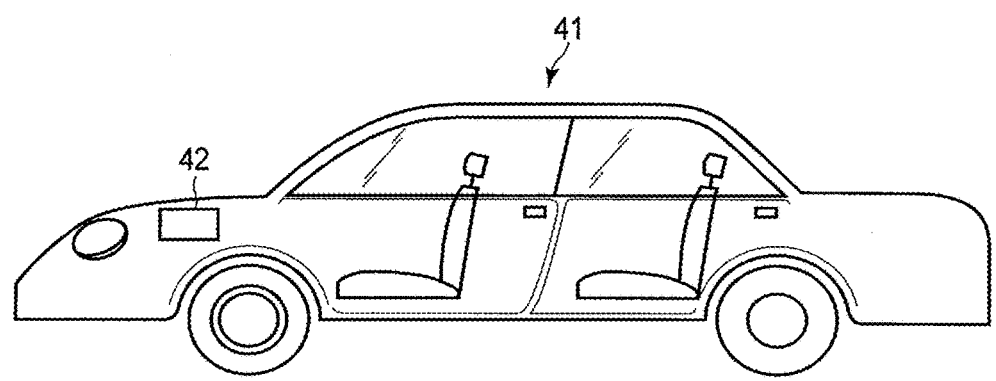
F I G. 8 ium ion nonaqueous electrolyte batteries are widely used as high energy density batteries in a variety of fields such as electric vehicles, electric power storage, and information instruments. Accordingly, market demands on nonaqueous electrolyte batteries are further growing, and active studies are being made.

ELECTRODE, NONAQUEOUS ELECTROLYTE BATTERY, BATTERY PACK AND VEHICLE

CROSS-REFERENCE TO RELATED APPLICATION

This application is based upon and claims the benefit of priority from the Japanese Patent Application No. 2016-183333, filed Sep. 20, 2016, the entire contents of which are incorporated herein by reference.

FIELD

Embodiments described herein relate generally to an electrode, a nonaqueous electrolyte battery, a battery pack, and a vehicle.

BACKGROUND

Lithium ion nonaqueous electrolyte batteries are widely used as high energy density batteries in a variety of fields such as electric vehicles, electric power storage, and information instruments. Accordingly, market demands on nonaqueous electrolyte batteries are further growing, and active studies are being made.

Among them, nonaqueous electrolyte batteries as a power source for electric vehicles are demanded to have a high energy density, or a high discharge capacity per unit weight or unit volume.

On the other hand, with the increase of the discharge capacity per unit weight or unit volume of a nonaqueous electrolyte battery, the demand for safety also increases. One of the resolutions for the demand is an all-solid-state secondary battery.

An all-solid-state secondary battery is a secondary battery including a solid electrolyte in place of a liquid nonaqueous electrolyte, more specifically a liquid organic electrolyte. Since liquid organic electrolytes are ignitable, techniques for improving safety of batteries including a liquid organic electrolyte are actively developed. However, it is still difficult to secure sufficient safety.

On the other hand, all solid secondary batteries include no liquid organic electrolyte, and thus carry an extremely low risk of ignition, and exhibit extremely high safety.

Furthermore, all-solid-state secondary batteries include no liquid electrolyte, which allows the use of an electrode having a bipolar structure. An electrode having the bipolar structure is obtained by providing a positive electrode on one surface of the current collector, and providing a negative electrode on another surface of the current collector. Furthermore, a bipolar battery is suitably formed by providing a solid electrolyte layer on each surface of the positive and negative electrodes, and stacking plural electrodes having the bipolar structure in such a manner that the positive and negative electrodes are opposed to each other, with a solid electrolyte layer or collector sandwiched therebetween. In this bipolar battery, the increase of the number of stacking allows the increase of the voltage in the battery.

BRIEF DESCRIPTION OF THE DRAWINGS

FIG. 1 is a schematic cross-sectional view of an example of an electrode according to a first embodiment.

FIG. 2 is a SSRM image of a cross-section of an example of an electrode according to a first embodiment.

FIG. 3 is a schematic cross-sectional view of an example of a nonaqueous electrolyte battery according to a second embodiment;

FIG. 4 is an enlarged cross-sectional view of an A portion in FIG. 3;

FIG. 5 is a schematic cross-sectional view of an electrode group which is included in another example of a nonaqueous electrolyte battery according to the second embodiment;

FIG. 7 is a block diagram showing an electric circuit of the battery pack in FIG. 6; and FIG. 8 is a schematic sectional view showing an example of a vehicle according to a fourth embodiment.

DETAILED DESCRIPTION

Figure 6:
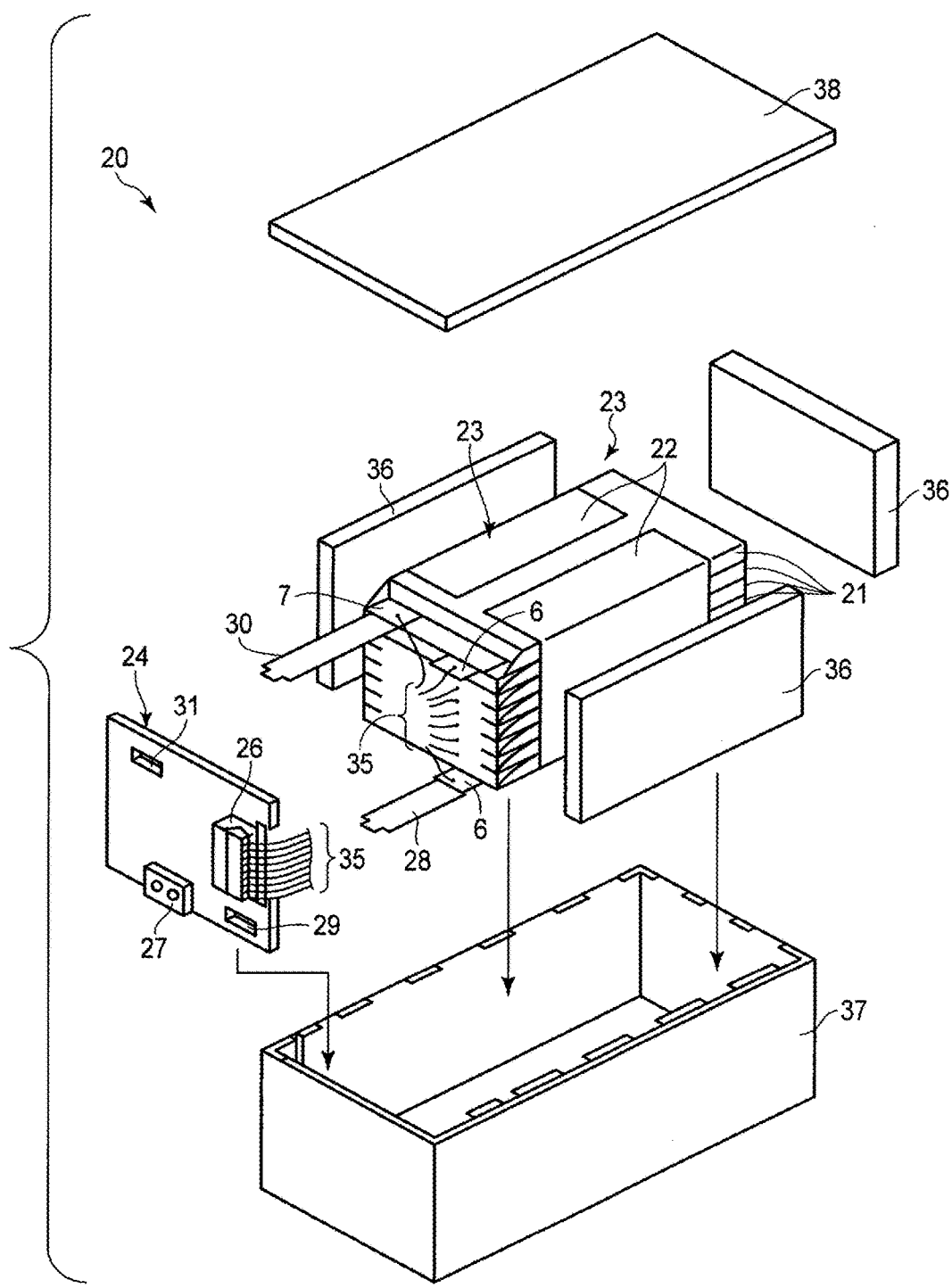
FIG. 6 is a schematic exploded perspective view of an example of a battery pack according to a third embodiment.

In general, according to one embodiment, an electrode is provided. The electrode includes a current collector and an active material-containing layer. The active material-containing layer is provided on the current collector. The active material-containing layer includes active material particles and insulator particles. The active material-containing layer has a first surface facing the current collector and a second face as a surface of the active material-containing layer. The second face includes a surface of a part of the insulator particles. A volume ratio of the insulator particles decrease from the second face toward the first surface in the active material-containing layer.

According to the embodiment, a nonaqueous electrolyte battery is provided. The nonaqueous electrolyte battery includes a positive electrode, a negative electrode, and nonaqueous electrolyte. At least one of the positive electrode and negative electrode is the electrode according to the embodiment.

According to the embodiment, a battery pack is provided. The battery pack includes the nonaqueous electrolyte battery according to the embodiment.

According to the embodiment, a vehicle is provided. The vehicle includes the battery pack according to the embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

(First Embodiment)

According to a first embodiment, an electrode is provided. The electrode includes a current collector and an active material-containing layer. The active material-containing layer is provided on the current collector. The active material-containing layer includes active material particles and insulator particles. The active material-containing layer has a first surface facing the current collector and a second face as a surface of the active material-containing layer. The second face includes a surface of a part of the insulator particles. A volume ratio of the insulator particles decrease from the second face toward the first surface in the active material-containing layer.

When the electrode according to the first embodiment is incorporated into a nonaqueous electrolyte battery, the second face of the active material-containing layer may be opposed to the counter electrode. For example, when the active material-containing layer is a negative electrode active material-containing layer including a negative electrode active material, the second face may be opposed to a member including a positive electrode active material, for example, a positive electrode active material-containing layer. Alternatively, when the active material-containing layer is a positive electrode active material-containing layer including a positive electrode active material, the second face may be opposed to a member including a negative electrode active material, for example, a negative electrode active material-containing layer.

In the active material-containing layer, the insulator particles can suppress the side reaction between the active material particles and other components, for example, a liquid nonaqueous electrolyte or a conductive agent. In the active material-containing layer, the side reaction between the active material particles and other components more readily occurs at the part to which the distance from the surface opposed to the counter electrode, or the second face of the active material-containing layer is smaller. In the active material-containing layer included in the electrode according to the first embodiment, the volume ratio of the insulator particles decreases from the second face toward the first surface. In other words, the active material-containing layer has a gradient of the volume ratio of the insulator particles. In yet other words, the part of the active material-containing layer, at which the side reaction between the active material particles and other components more readily occurs, includes a relatively large number of insulator particles. As a result of this, the side reaction in this part is sufficiently suppressed.

On the other hand, in the electrode according to the first embodiment, the longer the distance from the second face, which is to be opposed to the counter electrode, the longer the distance of insertion of Li into the active material particles included in that part, and the longer the distance of traveling of Li after extract from the active material to the second face, or the longer the migration distance of Li from/to the second face at the time of charge and discharge. In addition, the resistance acted on insertion and extraction of Li can more increase at the part from which the distance from the second face is larger. However, in the electrode according to the first embodiment, the content of the insulator particles decreases as the distance from the second face of the active material-containing layer increases. As a result of this, the part located at a larger distance from the second face of the active material-containing layer exhibits lower electric resistance. Therefore, in the electrode according to the first embodiment, the resistance acting on the active material particles included in the active material-containing layer during charge and discharge can be made more uniform. In addition, the more uniform the resistance acting on the active material particles included in the active material-containing layer, the more uniform the load on the active material particles, whereby, for example, local deterioration of the active material due to charge and discharge cycles can be suppressed.

In addition, as the distance from the reaction interface with the counter electrode increases, the amount of the insulator particles required for suppressing side reaction between the active material particles and other components decreases. Therefore, in the electrode according to the first embodiment, the content of the insulator particles is small in the part of the active material-containing layer located far from the second face, but side reaction of the active material particles is sufficiently suppressed.

Thus, in a nonaqueous electrolyte battery, the electrode according to the first embodiment can sufficiently suppress side reaction of the active material particles, and suppress local deterioration of the active material in the active material-containing layer. Accordingly, the electrode according to the first embodiment can realize a nonaqueous electrolyte battery exhibiting excellent life performance.

Next, the electrode according to the first embodiment is described in more detail.

The electrode according to the first embodiment includes a current collector, and an active material-containing layer provided on the current collector.

The current collector may be, for example, in the shape of a band having two surfaces.

The active material-containing layer may be provided on one surface of the current collector, or both surfaces of the current collector. The current collector may include a part not carrying the active material-containing layer. This part can work as, for example, an electrode tab.

The active material-containing layer includes active material particles and insulator particles. The active material-containing layer may further include, for example, a conductive agent and/or a binder.

The electrode according to the first embodiment may be used as a positive electrode or a negative electrode, depending on the operating potential of the active material particles included in the active material-containing layer and on the operating potential of the counter electrode used in combination.

Should be noted that the electrode according to the first embodiment may include two or more active material-containing layers. In this case, all of these active material-containing layers may be used as a positive electrode active material-containing layer or a negative electrode active material-containing layer. Alternatively, some of the active material-containing layers may be used as positive electrode active material-containing layers, the remainder being used as negative electrode active material-containing layers. The electrode having this structure is hereinafter referred to as an electrode having a bipolar structure.

The form of the active material particles and the form of insulator particles may be primary particles, secondary particles formed by aggregated primary particles, or a combination of primary and secondary particles.

The average particle size $D_i$ of the insulator particles is preferably smaller than the average particle size $D_a$ of the active material particles. In the electrode according to the preferred aspect, insulator particles having relatively small particle sizes constitute at least a part of the second face of the active material-containing layer, so that the active material-containing layer may include the second face having high flatness as the top surface. The second face exhibits excellent insulating property for electronic conduction. In addition, the active material-containing layer of the electrode according to the preferred aspect can include active material particles larger than insulator particles. The active material-containing layer exhibits excellent ion diffusivity owing to active material particles, and thus exhibits excellent ionic conductivity. The term "average particle size" herein means a volume average primary particle size when the particles include primary particles, a volume average secondary particle size when the particles are secondary particles, and a volume average particle size of a mixture without discrimination of primary and secondary particles when the particles are a mixture of primary and secondary particles.

The ratio $D_i/D_a$ of the average particle size is preferably from 0.0001 to 0.5, and more preferably from 0.01 to 0.2.

In addition, the active material-containing layer preferably includes a part of the insulator particles in the part wherein the distance from the first face is $T_1$. The distance $T_1$ is within the range of $0.01 \leq T_1/T \leq 1$, and T is the distance from the first face to the second face of the active material-containing layer, more specifically, the thickness of the active material-containing layer. The distance $T_1$ is more preferably within the range of $0.1 \leq T_1/T \leq 0.9$.

98% or more of the second face of the active material-containing layer preferably consists of the insulator particles. In the electrode according to the preferred aspect, the second face of the active material-containing layer can exhibit excellent insulating property. Therefore, when the electrode according to the aspect is combined with, for example, a counter electrode to constitute an electrode group, the use of a separator may be omitted. In addition, most part of the second face as a surface of the active material-containing layer includes the insulator particles. Therefore, even if a sharp substance sticks into the second face, the insulator particles can be present on the surface of the through holes formed due to the sticking. Therefore, the electrode according to this aspect can prevent short circuit at through holes when a sharp substance sticks into the surface, and thus prevents the occurrence of abnormal heat generation. It is more preferred that 99% or more of the second face of the active material-containing layer consists of the insulator particles. The second face may further include a part of the binder.

The current collector, active material particles, insulator particles, conductive agent, and binder are described below in more detail.

(1) Current Collector

As the current collector, for example, metal foil such as aluminum foil or aluminum alloy foil can be used. The thickness of the aluminum foil and aluminum alloy foil is preferably 20 μm or less, and more preferably 15 μm or less. As a result of this, weight reduction can be achieved while maintaining the strength of the electrode. The purity of the aluminum foil is preferably 99% by mass or more. The aluminum alloy is preferably an alloy containing an element such as Mg, Zn, or Si. When the alloy contains a transition metal such as Fe, Cu, Ni, or Cr, the content thereof is preferably 1% by mass or less.

(2) Active Material Particles

The active material particles included in the active material-containing layer can include, for example, active material particles exhibiting conductivity in a state where the active material particles contain Li inserted into the crystal structure. The active material particles can exhibit a resistance value of, for example, 1 mΩ to 100 kΩ in a state in a state where an active material included in the particles contains Li inserted into the crystal structure. The active material particles preferably exhibit a resistance value of 1 mΩ to 1 kΩ in a state wherein an active material included in the particles contains Li inserted into the crystal structure.

The operating potential of the active material particles is preferably 0.4 V (vs. Li/Li$^+$) or more. More specifically, the active material particles preferably include active material particles causing insertion of lithium ions at an electric potential of 0.4 V (vs. Li/Li$^+$) or more. The electrode according to this preferred aspect of the first embodiment, which is incorporated into a nonaqueous electrolyte battery, can suppress deposition of metal lithium on the second face as the surface of the active material-containing layer during the nonaqueous electrolyte battery is subjected to, for example, charge and discharge at a large current. Therefore, the nonaqueous electrolyte battery including the electrode according to the preferred aspect can prevent the occurrence of internal short-circuit when subjected to charge and discharge at a large current. The operating potential of the active material particles is preferably 3 V (vs. Li/Li$^+$) or less, and more preferably 2 V (vs. Li/Li$^+$) or less.

The active material may be, for example, a lithium alloy. The lithium alloy preferably includes Li and at least one metal element selected from the group consisting of Si, Al, Zn, Sn, and In. The lithium alloy may include, for example, Li and one element selected from the group consisting of Si, Al, Zn, Sn, and In. Alternatively, the lithium alloy may contain Li and two or more elements selected from the group consisting of Si, Al, Zn, Sn, and In. Specific examples include Li—Al, Li—Bi—Cd, and Li—Sn—Cd.

Other examples of the active material include titanium-containing oxides. Examples of the titanium-containing oxide include lithium titanium composite oxides. Examples of the lithium titanium oxide include a lithium titanate having a spinel-type crystal structure (for example, $Li_{4+x}Ti_5O_{12}$ ($-1 \leq x \leq 3$)), a lithium titanate having a ramsdellite-type crystal structure (for example, $Li_{2+x}Ti_3O_7$ ($0 \leq x \leq 1$)), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 \leq x \leq 1$). Lithium titanium oxides as described above are characterized by a small volume change during insertion and extraction of lithium.

Other examples of the titanium-containing oxide include titanium oxide. Examples of the titanium oxide include a titanium dioxide $TiO_2$ having an anatase-type crystal structure, and a titanium dioxide $TiO_2$ (B) having a monoclinic crystal structure.

Yet other examples of the active material include niobium-containing oxides. Examples of the niobium-containing oxide include a niobium oxide (for example $Nb_2O_5$), and a niobium titanium composite oxide having a monoclinic crystal structure (for example $Nb_2TiO_7$) that exhibits a lithium insertion and extraction potential of nobler than 1.0 V for the potential of metal lithium.

Other examples of the active material include the composite oxides having an orthorhombic crystal structure represented by the following general formula (1) or (2):

$$Li_aM1_{1-b}M2_bTi_{6-c}M3_cO_{14+d} \qquad (1),$$

wherein M1 is at least one selected from the group consisting of Sr, Ba, Ca, and Mg; M2 is at least one selected from the group consisting of Cs, K, and Na; M3 is at least one selected from the group consisting of Al, Fe, Zr, Sn, V, Nb, Ta, and Mo; the subscripts are within the range of $2 \leq a \leq 6$, $0 < b < 1$, $0 < c \leq 6$, and $-0.5 \leq d \leq 0.5$; M1 may include one selected from the group consisting of Sr, Ba, Ca, and Mg, or a combination of two or more selected from the group; M2 may include one selected from the group consisting of Cs, K, and Na, or a combination of two or more selected from this group; M3 may include one selected from the group consisting of Al, Fe, Zr, Sn, V, Nb, Ta, and Mo, or a combination of two or more selected from this group;

$$Li_{2+w}Na_{2-e}M\alpha_fTi_{6-g}M\beta_gO_{14+h} \qquad (2)$$

wherein Mα is at least one selected from the group consisting of Cs and K; Mβ is at least one selected from the group consisting of Zr, Sn, V, Nb, Ta, Mo, W, Fe, Co, Mn, and Al; the subscriptions are within the range of $0 \leq w \leq 4$, $0 < e < 2$, $0 \leq f < 2$, $0 < g \leq 6$, and $-0.5 \leq h \leq 0.5$; Mα may be one of Cs and K, or may include both of Cs and K; Mβ may include one selected from the group consisting of Zr, Sn, V, Nb, Ta, Mo, W, Fe, Co, Mn, and Al, or a combination of two or more selected from the group consisting of Zr, Sn, V, Nb, Ta, Mo, W, Fe, Co, Mn, and Al.

The composite oxide represented by the general formulae (1) or (2) preferably includes Nb. The preferred composite oxide may be referred to as a niobium-containing composite oxide having an orthorhombic crystal structure.

These composite oxides exhibit a small volume change due to insertion and extraction of lithium. In addition, these composite oxides exhibit a lower operating potential than the lithium titanate having the spinel structure. Therefore, the nonaqueous electrolyte battery including an electrode including any of these composite oxides as a negative electrode can exhibit a higher battery voltage than a nonaqueous electrolyte battery including the lithium titanate having the spinel structure as a negative electrode. In addition, these composite oxides exhibit, in the operating potential range, a charge curve and a discharge curve in each of which the potential changes with a significant gradient without the step of the potential. Therefore, in the nonaqueous electrolyte battery including any of these composite oxides, the state-of-charge can be easily grasped based on the voltage change.

The niobium-containing composite oxide having the orthorhombic crystal structure more preferably further include Na.

Yet other examples of the active material include silicon oxides and silicon alloys. Examples of the silicon oxide include SiO and Si—SiO composites. Examples of the silicon alloy include Si—Sn and Si—Li.

Yet other examples of the active material include metal sulfides. Examples of the metal sulfide include $TiS_2$, FeS, $FeS_2$, NiS, and $MoS_2$.

The titanium-containing oxides, the niobium-containing oxides, the orthorhombic composite oxides, the silicon oxides, the silicon alloys, and the metal sulfides, each of which is described above, may be used as, for example, a negative electrode active material. When the electrode according to the first embodiment includes a negative electrode active material-containing layer including the particles of the negative electrode active material, the active material particles included in the negative electrode active material-containing layer may include the particles of one kind among active materials listed above, or a combination of two or more of them. More specifically, the active material particles may include, for example, at least one kind of particles selected from the group consisting of particles of the lithium titanate having the spinel crystal structure, particles of the lithium titanate having the ramsdellite crystal structure, particles of the titanium oxide having the anatase crystal structure, particles of the titanium oxide having the monoclinic crystal structure, particles of the niobium titanium composite oxide having the monoclinic crystal structure, and particles of the niobium-containing composite oxide having the orthorhombic crystal structure.

Other examples of the active material include the active materials useful as positive electrode active materials.

Examples of the active material useful as a positive electrode active material include a manganese dioxide, an iron oxide, a copper oxide, and a nickel oxide, each of which includes lithium, a lithium manganese composite oxides (for example, $Li_sMn_2O_4$ or $Li_sMnO_2$ ($0 \leq s \leq 1$)), a lithium nickel composite oxide (for example, $Li_sNiO_2$ ($0 \leq s \leq 1$)), a lithium cobalt composite oxide (for example, $Li_sCoO_2$ ($0 \leq s \leq 1$)), a lithium nickel cobalt composite oxide (for example, $Li_sNi_{1-t}Co_tO_2$ ($0 \leq s \leq 1$, $0 \leq t \leq 1$)), a lithium manganese cobalt composite oxide (for example, $Li_sMn_tCo_{1-t}O_2$ ($0 \leq s \leq 1$, $0 \leq t \leq 1$)), a lithium manganese nickel composite oxide having a spinel crystal structure (for example, $Li_sMn_{2-t}Ni_tO_4$ ($0 \leq s \leq 1$, $0 \leq t \leq 1$)), a lithium phosphorus oxide having an olivine crystal structure (for example, $Li_sFePO_4$, $Li_sFe_{1-t}Mn_tPO_4$, and $Li_sCoPO_4$ ($0 \leq s \leq 1$, $0 \leq t \leq 1$)), an iron sulfate (for example, $Li_sFe_2(SO_4)_3$ ($0 \leq s \leq 1$)), and a vanadium oxide (for example $Li_sV_2O_5$ ($0 \leq s \leq 1$)). In addition, conductive polymer materials such as polyaniline and polypyrrole, and organic and inorganic materials such as disulfide polymer materials may be used.

When the active material particles are used as a positive electrode active material, the active material particles more preferably include a compound which can achieve a high battery voltage. Examples of such a compound include the lithium manganese composite oxide (for example, $Li_sMn_2O_4$), the lithium nickel composite oxide (for example, $Li_sNiO_2$), the lithium cobalt composite oxide (for example, $Li_sCoO_2$), the lithium nickel cobalt composite oxide (for example $Li_sNi_{1-t}Co_tO_2$), the lithium manganese nickel composite oxide having the spinel crystal structure (for example $Li_sMn_{2-t}Ni_tO_4$), the lithium manganese cobalt composite oxide (for example $Li_sMn_tCo_{1-t}O_2$), and the lithium iron phosphate (for example, $Li_sFePO_4$). In the above-described formula, each of s and t is preferably within the range of 0 to 1.

Yet other examples of the active material include the lithium nickel cobalt manganese composite oxide represented by a formula of $Li_iNi_jCo_kMn_lO_2$; wherein i, j, k, and l satisfy the relationships represented by the inequalities of $0 \leq i \leq 1.1$, $0.1 \leq j \leq 0.5$, $0 \leq k \leq 0.9$, and $0.1 \leq l \leq 0.5$.

When the electrode according to the first embodiment includes a positive electrode active material-containing layer including the particles of a positive electrode active material, the active material particles included in the positive electrode active material-containing layer may include the particles of one kind among the above-listed active materials useful as a positive electrode active material, or a combination of two or more among them. More specifically, the particles of an active material may contain the particles of, for example, at least kind of particles selected from the group consisting of particles of the lithium manganese composite oxide, particles of the lithium nickel composite oxide, particles of the lithium cobalt composite oxide, particles of the lithium nickel cobalt composite oxide, particles of the lithium manganese cobalt composite oxide, particles of the lithium manganese nickel composite oxide having the spinel crystal structure, particles of the lithium iron phosphate, and particles of the lithium nickel cobalt manganese composite oxide.

The active material particles described above may have, for example, a particle size within the range of 500 nm to 200 μm. The average particle size $D_a$ ($=D_{50}$) of the active material particles is preferably from 1 μm to 10 μm, and more preferably from 2 μm to 8 μm. In addition, the active material particles preferably have a particle size distribution wherein $D_{10}$ is from 0.6 μm to 7 μm, and $D_{90}$ is from 3 μm to 100 μm.

(3) Insulator Particles

The insulator particles included in the active material-containing layer are different from the active material particles, and can be a substance exhibiting no conductivity even in the state wherein the substance included in the insulator particles contains lithium inserted into the crystal structure of the substance. This substance can be a substance that exhibit, for example, a resistance value of 1 MΩ or more in the state wherein the substance contains Li inserted into the crystal structure of the substance. The insulator particles preferably exhibit a resistance value of 10 MΩ to 1 TΩ in the state wherein the substance included in the insulator particles contains Li inserted into the crystal structure of the substance.

Alternatively, the insulator particles may be a substance that causes no insertion or extraction of Li. This substance can have, for example, a resistance value of 10 MΩ or more, more preferably a resistance value of 10 MΩ to 1 TΩ irrespective of the state-of-charge of the electrode.

Accordingly, the active material particles and the insulator particles can be distinguished from each other by measuring the electric resistance of the particles included in the electrode in the state wherein Li is inserted. For example, when the electrode to be measured is a negative electrode, the battery is brought into a charged state, the battery in the state is disassembled with paying due attention, the negative electrode is taken out from the disassembled battery, and the negative electrode thus taken out is subjected to analysis. On the other hand, when the electrode to be measured is a positive electrode, the battery is brought into a discharged state, the battery is disassembled, the positive electrode is taken out from the disassembled battery, and the positive electrode thus taken out is subjected to analysis. The electric resistance of each of particles included in an electrode can be measured by scanning spreading resistance microscopy (SSRM). The specific measurement method will be described below.

The insulator particles can include at least one kind of particles selected from the group consisting of, for example, particle of a titanium hydroxide, particle of a barium titanate, particle of an alumina, particles of a zirconia (zirconium oxide), particles of an aluminum hydroxide (for example, gibbsite or bayerite), particle of a boehmite, particle of a cordierite, particle of a magnesium oxide, particle of an aramid, particle of a magnesium hydroxide, particle of a sialon, particle of a lithium tetraborate, particle of a lithium tantalate, particles of a forsterite, particles of a steatite, particles of a mica, particles of a silicon nitride, particles of an aluminum nitride, particles of a mullite, particles of a ferrite, particles of a cellulose, and particles of a zeolite. The insulator particles may include the particles of one kind or a combination of two or more kinds among these compounds. In addition, the insulator particles may contain two or more insulator particles containing a different compound.

By using titanium hydroxide, deterioration of the electrode layer can be suppressed because the titanium hydroxide can adsorb excessive moisture in the electrode. By using barium titanate, the output property can be improved. By using alumina, deterioration of the electrode layer can be suppressed because the alumina can adsorb excessive moisture in the electrode. In addition, by using sapphire, which is a single crystal of alumina, the deterioration of the electrode layer can be also suppressed because the sapphire can adsorb excessive moisture in the electrode. By using silicon nitride, mechanical strength of the electrode can be increased. By using aluminum nitride, thermal conductivity can be increased and, as a result, heat dissipation of the entire electrode can be increased, and allows stable operation of the battery.

Alternatively, the insulator particles may include solid electrolyte particles.

The solid electrolyte particles may be, for example, solid electrolyte particles, such as inorganic solid particles, having Li ion conductivity. The insulator particles may include the particles of one solid electrolyte, or a combination of two or more solid electrolytes.

The inorganic solid particles having Li ion conductivity are preferably inorganic solid particles having a garnet structure, because it has advantages such as high Li ion conductivity, high reduction resistance, and a wide electrochemical window. The inorganic solid particles having a garnet structure include $Li_{5+m}A_mLa_{3-m}M4_2O_{12}$ (wherein A is at least one selected from the group consisting of Ca, Sr, and Ba; A may contain one selected from the group consisting of Ca, Sr, and Ba, or a combination of two or more selected from the group consisting of Ca, Sr, and Ba; M4 is at least one of Nb and Ta; M4 may be Nb or Ta, or M contain both of Nb and Ta; m is within the range of $0 \leq m \leq 1.5$), $Li_3M5_{2-n}L_2O_{12}$ (wherein M5 is at least one of Ta and Nb; M5 may be Ta or Nb, or contain both of Ta and Nb; L is Zr; n is within the range of $0 \leq n \leq 0.5$), $Li_{7-3p}Al_pLa_3Zr_3O_{12}$ ($0 \leq p \leq 0.3$), and $Li_7La_3Zr_2O_{12}$.

Among them, $Li_{6.25}Al_{0.25}La_3Zr_3O_{12}$ and $Li_7La_3Zr_2O_{12}$ have high Li ion conductivity (ion conductivity), and are electrochemically stable, so that can exhibit excellent discharge performance and excellent cycle life performance.

When the insulator particles include solid electrolyte particles, solid electrolyte particles can exist inside the active material-containing layer. The solid electrolyte particles existing in the active material-containing layer can exchange Li with the active material particles existing inside the active material-containing layer. Therefore, the electrode according to this aspect of the first embodiment can exhibit more excellent input-and-output property in comparison with the electrode wherein the solid electrolyte particles exist only on the active material-containing layer. In addition, the electrode according to this aspect wherein the insulator particles include solid electrolyte particles can adopt, for example, a bipolar structure. The use of the electrode having a bipolar structure allows achieving a high voltage by one battery.

Furthermore, the solid electrolyte particles exhibit high Li conductivity. Therefore, the solid electrolyte particles form the second face having both high insulating property and high Li conductivity. The second face exhibits a higher Li transport number than, for example, a separator having the same porosity. The reason for this is as follows. For example, in a separator having a degree of porosity of 40% to 60%, liquid nonaqueous electrolyte permeates into the pores, and thereby migration of Li ions occurs. However, conversely, 60% to 40% is the main body materials of the separator. The main body materials of the separator cannot contribute to charge or discharge of the nonaqueous electrolyte battery. Therefore, the transport number of the separator is far lower than 1. The same applies to the case of the coating type separator. On the other hand, solid electrolyte particles exhibit high Li conductivity by themselves, so that the second face including the insulator particles of the solid electrolyte particles can exhibit a Li transport number close to 1, together with the liquid nonaqueous electrolyte penetrated into the pores of the particles.

The insulator particles may include the solid electrolyte particles and the insulator particles other than the solid electrolyte particles, the examples of which are described above.

The insulator particles may have, for example, a particle size of 10 nm to 200 nm. In addition, average particle size $D_i$ ($=D_{50}$) of the insulator particles is preferably, for example, from 30 nm to 100 nm, and more preferably from 60 nm to 70 nm. In addition, the insulator particles preferably have a particle size distribution wherein $D_{10}$ is from 30 nm to 50 nm, and $D_{90}$ is from 100 nm to 130 nm.

(4) Conductive Agent

The conductive agent is added for, for example, improving the current-collecting performance and suppressing contact resistance with the current collector. Examples of the conductive agent include carbon-based materials such as coke, carbon black, graphite, carbon nanofibers, and carbon nanotubes. The average particle size of the carbon material is preferably from 0.1 μm to 10 μm. When the average particle size is 0.1 μm or more, gas generation can be effectively suppressed. When the average particle size is 10 μm or less, good conductive network is obtained. The specific surface area of the carbon-based material is preferably from 10 m$^2$/g to 100 m$^2$/g. When the specific surface area is 10 m$^2$/g or more, good conductive network is obtained. When the specific surface area is 100 m$^2$/g or less, gas generation can be effectively suppressed.

(5) Binder

The binder is used, as necessary, for binding the active material particles, the insulator particles, the conductive agent, and the current collector. Examples of the binder include carboxymethyl cellulose (CMC), hydroxypropylmethyl cellulose propyl (HPMC), cellulose acetate, ammonium salt cellulose, polytetrafluoroethylene (PTFE), polyvinylidene fluoride (PVdF), fluorine rubber, styrene-butadiene rubber, polyacrylate compounds (for example, acrylic rubber and acrylic resin), and imide compounds (for example, polyamide imide). Among them, one may be used alone, or combination of two or more of them may be used.

The use of any of these binders can improve bindability between the current collector and active material-containing layer. As a result of this, strength of the electrode can be improved.

(6) Blending Quantity

In the active material-containing layer, the active material particles, the insulator particles, the conductive agent, and the binder are preferably included in the proportions of 60% to 97.9% by mass, 0.1% to 20% by mass, 1% to 10% by mass, and 1% to 10% by mass, respectively.

In the case where the insulator particles are included in the proportion of 0.1% to 20% by mass, excellent balance between the life performance and energy density can be established. The proportion of the insulator particles is more preferably from 2% to 6% by mass.

If the content of the conductive agent is 1% by mass or more, the above-described effect can be achieved. If the content of the conductive agent is 10% by mass or less, decomposition of the nonaqueous electrolyte, which may occur on the surface of the conductive agent when the battery is stored at a high temperature, can be suppressed.

If the content of the binder is 1% by mass, sufficient electrode strength can be obtained. The binder is an insulating material, so that its amount is preferably 10% by mass or less. As a result of this, the increase of internal resistance can be suppressed.

In the active material-containing layer, the volume of the active material particles is preferably from 3 times to 100 times, and more preferably from 4 times to 10 times the volume of the insulator particles.

<Production Method>

Next, an example of the production method of the electrode according to the first embodiment is described.

Firstly, the active material particles, the insulator particles, the conductive agent, and the binder as the materials of the active material-containing layer are provided. At that time, as the insulator particles, those having the average particle size $D_i$ of the insulator particles smaller than the average particle size $D_a$ of the active material particles and that of conductive agent. They are put into an appropriate solvent (for example, water or N-methyl-2-pyrrolidone) to obtain a mixture.

Next, the mixture is stirred to obtain slurry. The slurry is applied to one surface of the current collector via, for example, a coating die head.

Next, the current collector coated with the slurry on one surface is introduced into a drying furnace. At that time, the surface coated with the slurry is upward, and the heating temperature at a first zone of the drying furnace is adjusted to 130° C. or higher. The heating temperature is preferably within from 135° C. to 180° C. The heating time is preferably within from 30 seconds to 30 minutes, and more preferably from 1 minute to 10 minutes. The heat during the drying can cause convection, and then can cause abrupt migration in the slurry. During the migration, as the solvent migrates to the upward surface of the slurry, the insulator particles having a smaller particle size than that of the active material particles also migrate toward the slurry surface. The mobility at this time depends on the particle size, so that the insulator particles having a particle size distribution are scattered so as to increase the volume concentration from the current collector toward the slurry surface. Then, the slurry surface is dominated by the insulator particles.

When the slurry is dried in this state, the active material-containing layer, wherein the volume ratio of the insulator particles decreases from the second face as the surface toward the first face facing to the current collector, is obtained.

After the first zone, drying is preferably carried out at a temperature of 135° C. or lower, and more preferably 130° C. or lower.

The electrode further including the active material-containing layer provided on the other surface of the current collector can be made as follows. Firstly, the slurry explained above is applied to another surface of the current collector including the active material-containing layer obtained as described above provided on the one surface. Subsequently, the current collector coated with the slurry is introduced into a drying furnace while the surface coated with the slurry is upward. At this time, drying is carried out in the same manner as explained above, whereby an electrode having active material-containing layers provided on both surfaces of the current collector is obtained. Should be noted that in the drying at this stage, heating is carried out while the active material-containing layer previously provided is downward, but the active material-containing layer contains no or little solvent, so that migration similar to that occurring in the slurry hardly occurs, which can maintain the gradient of the volume ratio of the insulator particles.

This method requires as much as twice drying for obtaining an electrode. Therefore, this method reduces heat shock given to the current collector due to drying.

On the other hand, the formation of a coating type separator requires the steps of applying a slurry of the electrode material to the current collector, drying it to form an electrode layer, applying the coating separator material to the upper portion, and then drying it to form a coating type separator layer. These steps are carried out for the both surfaces of the current collector. This requires four times of application process. In other words, the man-hour can be twice the method described herein. Furthermore, the coating type separator requires four times of drying in a drying furnace, which can increase the deterioration of strength of the current collector foil such as aluminum foil due to heat shock. As a result of this, the current collection foil can be easily ruptured in the subsequent electrode pressing process and battery making processes such as collective welding of the current-collecting parts, which can cause marked decrease in the yield.

Next, a specific example of the electrode according to the first embodiment is described below with reference to drawings.

FIG. 1 is a schematic cross sectional view of an example of the electrode according to the first embodiment.

An electrode 1 shown in FIG. 1 includes a current collector 1a, and an active material-containing layer 1b formed on one surface of the current collector 1a.

An active material-containing layer 1b has a first face 1b-1 faced to the current collector 1a, and a second face 1b-2 as the surface of the active material-containing layer 1b. The distance between the first face 1b-1 and second face 1b-2, more specifically the thickness of the active material-containing layer 1b is T.

The active material-containing layer 1b contains active material particles 11 and insulator particles 12, and a conductive agent 13. In addition, the active material-containing layer 1b further contains a binder not shown. The binder is located between the active material particles 11, insulator particles 12, and conductive agent 13.

In the active material-containing layer 1b, a part of the insulator particles 12 is located, as shown in FIG. 1, in the second face 1b-2. As a result, at least a part of the second face 1b-2 consists of a part of the insulator particles 12. Most of the second face 1b-2 shown in FIG. 1 is dominated by a part of the insulator particles 12, and the remaining part of the second face 1b-2 is partly dominated by a binder not shown, and partly void.

In addition, as shown in FIG. 1, the insulator particles 12 are diffused as a gradient material in the active material-containing layer 1b. In other words, the insulator particles 12 are, as shown in FIG. 1, distributed in the active material-containing layer 1b while being mixed with the active material particles 11 and conductive agent 13, with the volume ratio thereof decreased from the second face 1b-2 toward the first face 1b-1. More specifically, in the active material-containing layer 1b, the volume ratio of the insulator particles 12 decreases from the second face 1b-2 toward the first face 1b-1.

In addition, in the electrode 1 shown in FIG. 1, the part of the active material-containing layer 1b located at the distance $T_1$ from the first face 1b-1 includes a part of the insulator particles 12. In other words, a part of the insulator particles 12 is present in the part of the active material-containing layer 1b located at the distance $(T-T_1)$ from the second face 1b-2.

<Measurement Method>

Various measurement methods are described below.

<Distinction Between Active Material Particles and Insulator Particles>

The active material particles and insulator particles each included in the active material-containing layer can be specifically distinguished in the following manner.

Firstly, a nonaqueous electrolyte battery containing the electrode to be measured is provided.

Next, the nonaqueous electrolyte battery provided is subjected to charge or discharge using a charge and discharge apparatus, and adjusted to an SOC of about 30 to 80%, preferably 40 to 60%. The nonaqueous electrolyte battery having the state-of-charge thus adjusted is disassembled in, for example, a glove box filled with argon. And then, the electrode is taken out with cautioning not to energize the positive and negative electrodes.

And then, the electrode taken out is thoroughly washed with diethyl carbonate (abbreviated as DEC). Subsequently, the washed electrode is transferred to a container for vacuum drawing. The pressure in the container is reduced to −100 kPa, and the state is maintained for 1 hour. Subsequently, the pressure in the container is brought to the atmospheric pressure in argon atmosphere. In this manner, a liquid nonaqueous electrolyte contained in the electrode can be removed. When a liquid nonaqueous electrolyte is not included in the battery to be measured, this process can be omitted.

Next, a part of the active material-containing layer of the washed electrode is cleanly treated using an ion milling apparatus to obtain the cross-section of the part of the active material-containing layer, while preventing atmosphere exposure. The sample thus made is installed on a scanning spreading resistance microscopy (SSRM) measuring apparatus.

Measurement is carried out repeatedly by SSRM from the current collector side toward the electrode layer surface. SSRM is a method allowing the local measurement of spread resistance at a nanometer scale. This measurement allows classification of the particles included in the active material-containing layer into the active material particles, the insulator particles, and the conductive agent particles.

FIG. 2 is an SSRM image of the cross section of an example of the electrode according to the first embodiment. The electrode whose SSRM image is shown in FIG. 2 includes the particles of a niobium titanium composite oxide ($Nb_2TiO_7$: NTO) as active material particles and particles of an alumina ($Al_2O_3$) as insulator particles at a volume ratio of 6:1.

In FIG. 2, the region having low brightness is the region wherein the particles having a resistance value of 10 GΩ or more, or the insulator particles exist. On the other hand, the region having high brightness is the region wherein particles having a resistance value of 10 kΩ or less, or the active material particles and conductive material exist. Further increase of the resolution allows distinction between the active material particles and conductive agent, and confirmation of the particle shape. The region having high brightness at the lower part of FIG. 2 is the image of the current collector.

As is evident from FIG. 2, a part of the insulator particles dominates the second face as the surface of the active material-containing layer. In addition, the abundance ratio (existing area) of the insulator particles decreases from the second face toward the first face faced to the current collector in the active material-containing layer.

Furthermore, the particle size of the particles included in the cross section can be confirmed by observing the same cross section by scanning electron microscopy (SEM), and using the length measurement function of SEM. This allows confirmation of the gradient state of the particle size of the particles in the active material-containing layer.

<Method for Measuring Volume Ratio of Insulator Particles>

On the other hand, the surface (second face) of the other part of the active material-containing layer of the washed electrode is observed from above by SSRM and SEM, and images are obtained. Subsequently, the surface of the electrode active material-containing layer is dug down by ion milling at a depth of 1/10 the thickness T of the electrode active material-containing layer, and the exposed new surface is observed by SSRM and SEM, and images are obtained. Repeating the same operation provides the SSRM and SEM images of the cross sections at distances of T/10, 2T/10, 3T/10, 4T/10, 5T/10, 6T/10, 7T/10, 8T/10, and 9T/10 from the second face of the electrode active material-containing layer. The volume ratios and gradient of the volume ratio of the insulator particles in the active material-containing layer can be known from these images. In addition, from these images, the gradient of the particle size of the particles included in the active material-containing layer can be known.

<Method for Identifying Active Material Included in Active Material Particles>

The active material particles can be identified by, for example, the following method. Firstly, the cross section of the active material-containing layer of the electrode obtained as explained above is observed by SSRM analysis, and the active material particles are specified. Subsequently, the same cross section is observed by SEM equipped with energy dispersive X-ray spectroscopy (EDX) apparatus, and the particles judged as active material particles by the aforementioned SSRM analysis are subjected to EDX analysis. The EDX analysis allows the identification of the composition and crystal structure of the active material particles.

<Method for Identifying Insulator Particles>

The insulator particles can be also identified in the same manner as the method for identifying the active material particles.

According to a first embodiment, an electrode is provided. The electrode includes an active material-containing layer. The active material-containing layer includes active material particles and insulator particles. The second face of the active material-containing layer as the surface of the active material-containing layer includes a part of the insulator particles. A volume ratio of the insulator particles decrease from the second face toward the first face in the active material-containing layer. The insulator particles, which have a gradient of the volume ratio in the active material-containing layer, can suppress side-reaction between the active material particles and other components as well as can make load on the active material-containing layer uniform. As a result, the electrode according to the first embodiment can achieve a nonaqueous electrolyte battery which can exhibit excellent life performance.

(Second Embodiment)

According to a second embodiment, a nonaqueous electrolyte battery is provided. The nonaqueous electrolyte battery includes a positive electrode, a negative electrode, and a nonaqueous electrolyte. At least one of the positive electrode and the negative electrode is the electrode according to the first embodiment.

In a preferred aspect, the negative electrode is the electrode according to the first embodiment. In a more preferred aspect, both of the positive and negative electrodes are the electrodes according to the first embodiment.

In other aspect, the positive and negative electrodes may constitute an electrode having a bipolar structure. The electrode having the bipolar structure may include a current collector, a positive electrode active material-containing layer and a negative electrode active material-containing layer, each of which provided on the current collector. The positive electrode active material-containing layer and/or negative electrode active material-containing layer, each of which may be included in the electrode having the bipolar structure, may be the active material-containing layer included in the electrode according to the first embodiment.

A nonaqueous electrolyte battery having separated positive and negative electrodes, and a nonaqueous electrolyte battery including an electrode having a bipolar structure are described below as the examples of the nonaqueous electrolyte battery according to the second embodiment.

(1) Nonaqueous Electrolyte Battery Having Separated Positive and Negative Electrodes The nonaqueous electrolyte battery of the present example includes separated positive and negative electrodes.

The positive and negative electrodes are arranged in such a manner that the positive electrode active material-containing layer and the negative electrode active material-containing layer are opposed to each other, to constitute an electrode group. In the electrode group, a separator may be provided between the positive electrode active material-containing layer and the negative electrode active material-containing layer.

The electrode group may have, for example, a stacked structure. In the stacked structure, positive electrodes and the negative electrodes are stacked in such a manner that one positive electrode active material-containing layer and one negative electrode active material-containing layer are opposed to each other.

Alternatively, the electrode group may have a wound structure. The wound structure is obtained by stacking the positive and negative electrodes in such a manner that the positive electrode active material-containing layer and negative electrode active material-containing layer are opposed to each other to obtain a stack, and spirally winding the stack. The electrode group having a wound structure may be cylindrical or flat. A flat electrode group can be obtained by, for example, pressing the coil obtained by winding as described above.

The nonaqueous electrolyte battery of the present example further includes a nonaqueous electrolyte. The solid electrolyte particles as an example of the insulator particles, which may be included in the electrode according to the first embodiment as positive electrode and/or negative electrode, may constitute at least a part of the nonaqueous electrolyte. The nonaqueous electrolyte battery of the present example may further include a liquid nonaqueous electrolyte other than solid electrolyte particles as a nonaqueous electrolyte. The nonaqueous electrolyte may be hold by the electrode group.

In addition, the nonaqueous electrolyte battery of the present example may further include a container member accommodating the electrode group and the nonaqueous electrolyte.

Furthermore, the nonaqueous electrolyte battery of the present example may further include a positive electrode terminal electrically connected to a positive electrode, and a negative electrode terminal electrically connected to a negative electrode. At least a part of the positive electrode terminal and at least a part of the negative electrode terminal may extend outside the container member.

(2) Nonaqueous Electrolyte Battery Including Electrode Having Bipolar Structure

The nonaqueous electrolyte battery of the present example includes the above-explained electrode having the bipolar structure.

The electrode having the bipolar structure may constitute an electrode group wherein the positive electrode active material-containing layer and the negative electrode active material-containing layer are opposed to each other. In the electrode group, a separator may be provided between the positive electrode active material-containing layer and the negative electrode active material-containing layer.

The electrode group, which may be included in the nonaqueous electrolyte battery of the present example, may have, for example, a stacked structure. In the stacked structure, for example, electrodes each having the bipolar structure are laminated in such a manner that the positive electrode active material-containing layer and the negative electrode active material-containing layer are opposed to each other.

Alternatively, the electrode group may have a wound structure. The wound structure can be obtained by spirally winding the electrode having the bipolar structure electrode group.

The nonaqueous electrolyte battery of the present example further includes a nonaqueous electrolyte. The solid electrolyte particles as an example of the insulator particles, which may be included in the positive electrode active material-containing layer and/or the negative electrode active material-containing layer, may constitute at least a part of the nonaqueous electrolyte. The nonaqueous electrolyte battery of the present example may further include a liquid nonaqueous electrolyte other than solid electrolyte particles as a nonaqueous electrolyte. The nonaqueous electrolyte may be hold by the electrode group.

In addition, the nonaqueous electrolyte battery of the present example may further include a container member accommodating the electrode group and nonaqueous electrolyte.

Furthermore, the nonaqueous electrolyte battery of the present example may further include a positive electrode terminal electrically connected to the current collector of at least one electrode, and a negative electrode terminal electrically connected to the current collector of at least one electrode. At least a part of the positive electrode terminal and at least a part of the negative electrode terminal may extend outside the container member.

The positive electrode, the negative electrode, the electrode having the bipolar structure, the separator, nonaqueous electrolyte, the container member, the positive electrode terminal, and the negative electrode terminal, each of which may be included in the nonaqueous electrolyte battery according to the second embodiment, are described below in more detail.

(a) Positive Electrode

The positive electrode may be the electrode according to the first embodiment. Alternatively, when the negative electrode is the electrode according to the first embodiment, the positive electrode may not the electrode according to the first embodiment.

When the positive electrode is the electrode according to the first embodiment, the active material-containing layer, more specifically the positive electrode active material-containing layer may include, as active material particles, for example, particles of the active material listed in the first embodiment as the active material useful as a positive electrode active material.

When the positive electrode is not the electrode according to the first embodiment, the positive electrode may also have a structure similar to the electrode according to the first embodiment. More specifically, the positive electrode of this aspect may include a current collector, and a positive electrode active material-containing layer provided on one or both surfaces of the current collector. The current collector may include a part not carrying the positive electrode active material-containing layer. This part can work as a positive electrode tab. The positive electrode active material-containing layer may include, for example, a positive electrode active material and, as necessary, a conductive agent and a binder.

Examples of the positive electrode active material that may be included in the positive electrode of this aspect include those listed in the first embodiment as the active material useful as a positive electrode active material. Examples of any conductive agent and binder include the conductive agent and binder, each of which is listed in the first embodiment.

In the positive electrode active material-containing layer included in the positive electrode of this aspect, the proportions of the positive electrode active material, the conductive agent, and the binder are preferably from 80% to 95% by mass, from 3% to 18% by mass, and from 2% to 17% by mass, respectively.

When the content of the conductive agent is 3% by mass or more, the effects of increasing the current-collecting performance and reducing contact resistance between the positive electrode active material and current collector can be more enhanced. When the content of the conductive agent is 18% by mass or less, decomposition of the nonaqueous electrolyte occurring on the surface of the conductive agent when the battery is stored at high temperature can be suppressed.

When the content of the binder is 2% by mass or more, sufficient positive electrode strength can be achieved. The binder is an insulating material, so that the content is preferably 17% by mass or less. As a result of this, increase in the internal resistance can be suppressed.

When the positive electrode is not the electrode according to the first embodiment, the positive electrode can be made by, for example, by the following method. Firstly, the positive electrode active material, the binder, and the conductive agent are suspended in an appropriate solvent to prepare slurry. Subsequently, the slurry is applied to the surface of the positive electrode current collector, and the coated film is dried. The dried coated film is subjected to pressing, whereby a positive electrode including a positive electrode current collector, and a positive electrode active material-containing layer provided thereon is made. Alternatively, the positive electrode of the present embodiment may be made by forming a positive electrode active material, a binder, and a conductive agent into pellets, and placing these pellets on the positive electrode current collector to form a positive electrode active material-containing layer.

The density of the positive electrode active material-containing layer is preferably 3 $g/cm^3$ or more.

(b) Negative Electrode

The negative electrode may be the electrode according to the first embodiment. Alternatively, when the positive electrode is the electrode according to the first embodiment, the negative electrode may not be the electrode according to the first embodiment.

When the negative electrode is the electrode according to the first embodiment, the active material-containing layer, or the negative electrode active material-containing layer may include, as active material particles, for example, particles of the active material listed in the first embodiment as the active material useful as a negative electrode active material.

When the negative electrode is not the electrode according to the first embodiment, the negative electrode may also have a structure similar to the electrode according to the first embodiment. More specifically, the negative electrode of this aspect may include a current collector, and a negative electrode active material-containing layer provided on one or both surfaces of the current collector. The current collector may include a part not carrying the negative electrode active material-containing layer. This part can work as a negative electrode tab. The negative electrode active material-containing layer may include, for example, a negative electrode active material and, as necessary, a conductive agent and a binder.

Examples of the negative electrode active material that may be included in the negative electrode of this aspect include those listed in the first embodiment as the active material useful as a negative electrode active material. Examples of any conductive agent and binder include the conductive agent and binder, each of which is listed in the first embodiment.

In the negative electrode active material-containing layer included in the negative electrode of this aspect, the proportions of the negative electrode active material, the conductive agent, and the binder are preferably from 80% to 95% by mass, from 3% to 18% by mass, and from 2% to 17% by mass, respectively.

When the content of the conductive agent is 3% by mass or more, the effect of increasing the current-collecting performance and reducing contact resistance between the positive electrode active material and current collector can be more enhanced. When the content of the conductive agent is 18% by mass or less, decomposition of the nonaqueous electrolyte occurring on the surface of the conductive agent when the battery is stored at high temperature can be suppressed.

When the content of the binder is 2% by mass or more, sufficient positive electrode strength can be achieved. The binder is an insulating material, so that the content is preferably 17% by mass or less. As a result of this, enhancement of the internal resistance is suppressed.

When the negative electrode is not the electrode according to the first embodiment, the negative electrode can be made by, for example, by the following method. Firstly, the negative electrode active material, binder, and conductive agent are suspended in an appropriate solvent to prepare slurry. Subsequently, the slurry is applied to the surface of the negative electrode current collector, and the coated film is dried. The dried coated film is subjected to pressing, whereby a negative electrode including a negative electrode current collector, and a negative electrode active material-containing layer formed thereon is made. Alternatively, the negative electrode of the present embodiment may be made by forming a negative electrode active material, a binder, and a conductive agent into pellets, and placing these pellets on the negative electrode current collector to form a negative electrode active material-containing layer.

The density of the negative electrode active material-containing layer is preferably from 2 g/cm$^3$ to 2.9 g/cm$^3$.

(c) Electrode Having Bipolar Structure

The electrode having a bipolar structure may include, as explained above, for example, a current collector, and a positive electrode active material-containing layer and a negative electrode active material-containing layer, which are provided on the current collector.

In the aspect including the electrode having the bipolar structure, the positive electrode active material-containing layer and/or negative electrode active material-containing layer of this electrode is the active material-containing layer included in the electrode according to the first embodiment.

When the positive electrode active material-containing layer is the active material-containing layer included in the electrode according to the first embodiment, the positive electrode active material-containing layer may include, as active material particles, for example, the particles including the active material listed in the first embodiment as the active material useful as the positive electrode active material.

On the other hand, when the positive electrode active material-containing layer is not the active material-containing layer included in the electrode according to the first embodiment, the positive electrode active material-containing layer may have a structure similar to the above-explained positive electrode active material-containing layer included in the positive electrode that is not the electrode according to the first embodiment.

When the negative electrode active material-containing layer is the active material-containing layer included in the electrode according to the first embodiment, the negative electrode active material-containing layer may include, as active material particles, for example, particles including the active material listed in the first embodiment as the active material useful as a negative electrode active material.

On the other hand, when the negative electrode active material-containing layer is not the active material-containing layer included in the electrode according to the first embodiment, the negative electrode active material-containing layer may have a structure similar to that of the above-explained negative electrode active material-containing layer included in the negative electrode which is not the electrode according to the first embodiment.

(d) Separator

The separator may be formed of, for example, a porous film including polyethylene, polypropylene, cellulose, or polyvinylidene fluoride (PVdF), or a synthetic resin nonwoven fabric. The porous film formed of polyethylene or polypropylene may be molten at a certain temperature, and can block the current. Accordingly, the use of any of these films can improve safety.

(e) Nonaqueous Electrolyte

The nonaqueous electrolyte may be, for example, a liquid nonaqueous electrolyte, a gel nonaqueous electrolyte, or a solid electrolyte. The liquid nonaqueous electrolyte can be prepared by dissolving an electrolyte in an organic solvent. The concentration of the electrolyte is preferably from 0.5 to 2.5 mol/L. The gel nonaqueous electrolyte can be prepared by mixing a liquid electrolyte and a polymer material to prepare a composite. The liquid nonaqueous electrolyte and/or the gel nonaqueous electrolyte may be impregnated in, for example, an electrolyte layer.

The solid electrolyte may be, for example, the solid electrolyte particles described in the first embodiment. In the nonaqueous electrolyte battery according to the second embodiment, a solid electrolyte layer may be provided between, for example, the positive electrode active material-containing layer and negative electrode active material-containing layer.

When the electrode according to the first embodiment includes solid electrolyte particles as insulator particles, the additional use of a liquid or gel nonaqueous electrolyte can further improve ionic conductivity.

Examples of the electrolyte included in the liquid nonaqueous electrolyte include lithium salts such as a lithium perchlorate (LiClO$_4$), a lithium hexafluorophosphate (LiPF$_6$), lithium tetrafluoroborate (LiBF$_4$), lithium hexafluoroarsenate (LiAsF$_6$), lithium trifluoromethanesulfonate (LiCF$_3$SO$_3$), and lithium bistrifluoromethylsulfonylimide (LiN(CF$_3$SO$_2$)$_2$), and mixtures thereof. The electrolyte is preferably one which is hard to be oxidized even at a high electric potential, and most preferably LiPF$_6$.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2-MeTHF), and dioxolane (DOX); linear ethers such as dimethoxyethane (DME), and diethoxyethane (DEE); γ-butyrolactone (GBL), acetonitrile (AN), and sulfolane (SL). One of these organic solvents may be used alone, or two or more of these solvents may be used as a mixed solvent.

γ-butyrolactone (GBL) and a mixed solvent including at least two or more of, and, propylene carbonate (PC), ethylene carbonate (EC), and GBL is suitable for the use in a battery used at high temperature environments, for example, a battery installed in a vehicle.

Examples of the polymer material include polyvinylidene fluoride (PVdF), polyacrylonitrile (PAN), and polyethylene oxide (PEO).

Alternatively, the nonaqueous electrolyte may be an ordinary temperature molten salt (ionic melts) containing Li ions.

The ordinary temperature molten salt refers to a salt at least a part of which exhibits a liquid state at ordinary temperature. The ordinary temperature refers to the temperature range wherein the power source is assumed to normally operate. For the temperature range wherein the power source is assumed to normally operate, the upper limit is about 120° C., or about 60° C. according to circumstances, and the lower limit is about −40° C., and about −20° C. according to circumstances.

As the lithium salt, there is used a lithium salt having a wide electric potential window such as those commonly used in nonaqueous electrolyte batteries. Examples include, but not limited to, $LiBF_4$, $LiPF_6$, $LiClO_4$, $LiCF_3SO_3$, $LiN(CF_3SO_2)_2$, $LiN(C_2F_5SO_2)_2$, and $LiN(CF_3SC(C_2F_5SO_2))_3$. Among them, one may be used alone, or two or more of them may be used as a mixture.

The content of the lithium salt is preferably from 0.1 to 3 mol/L, and particularly preferably from 1 to 2 mol/L. When the content of the lithium salt is 0.1 mol/L or more, resistance of the electrolyte can be decreased, so that large current-low temperature discharge characteristics can be improved. When the content of the lithium salt is 3 mol/L or less, the melting point of the electrolyte can be kept low and the electrolyte can be kept in a liquid state at room temperature.

Examples of the ordinary temperature molten salt include one having a quaternary ammonium organic cation, or one having an imidazolium cation.

Examples of the quaternary ammonium organic cation include imidazolium ions such as dialkyl imidazolium and trialkyl imidazolium; tetraalkyl ammonium ion, alkyl pyridinium ion, pyrazolium ion, pyrrolidinium ion, and piperidinium ion. In particular, imidazolium cation is preferred.

Examples of the tetraalkyl ammonium ion include, but not limited to, trimethylethyl ammonium ion, trimethylpropyl ammonium ion, trimethylhexyl ammonium ion, and tetrapentyl ammonium ion.

Examples of the alkyl pyridinium ion include, but not limited to, N-methylpyridinium ion, N-ethyl pyridinium ion, N-propyl pyridinium ion, N-butyl pyridinium ion, 1-ethyl-2-methylpyridinium ion, 1-butyl-4-methylpyridinium ion, and 1-butyl-2,4-dimethylpyridinium ion.

Among ordinary temperature molten salts having any one of the cations described above, one may be used alone, or two or more of them used as a mixture.

Examples of the imidazolium cation include, but not limited to, dialkyl imidazolium ion, and trialkyl imidazolium ion.

Examples of the dialkyl imidazolium ion include, but not limited to, 1,3-dimethylimidazolium ion, 1-ethyl-3-methyl-imidazolium ion, 1-methyl-3-ethyl imidazolium ion, 1-methyl-3-butyl imidazolium ion, and 1-butyl-3-methyl-imidazolium ion.

Examples of the trialkyl imidazolium ion include, but not limited to, 1,2,3-trimethylimidazolium ion, 1,2-dimethyl-3-ethyl imidazolium ion, 1,2-dimethyl-3-propyl imidazolium ion, and 1-butyl-2,3-dimethylimidazolium ion.

Among the ordinary temperature molten salts having any one of the cations described above, one may be used alone, or two or more of them used as a mixture.

In a battery including a nonaqueous electrolyte including an ordinary temperature molten salt, the use of at least one compound selected from the group consisting of a lithium iron phosphate (for example, $Li_sFePO_4$ ($0 \leq s \leq 1$)), a lithium manganese composite oxide, lithium nickel composite oxide, and lithium nickel cobalt composite oxide is preferred. Due to this structure, reactivity between a positive electrode active material and an ordinary temperature molten salt can be decrease, whereby cycling characteristics can be improved.

(f) Container Member

Examples of the container member include containers formed of a laminate film or metal. The shape of the container member may be flat (thin), square, cylinder, coin, button, sheet, or stack. The shape and sized of the container member can be appropriately designed according to the battery dimension. For example, container members for small batteries installed in mobile electronic equipment, or container members for large batteries installed in two-wheel to four-wheel automobiles are used.

The laminate film is a multilayer film including a metal layer and a resin layer covering the metal layer. The metal layer is preferably aluminum foil or aluminum alloy foil. This reduces the battery weight. The aluminum alloy is preferably an alloy containing an element such as Mg, Zn, or Si. When a transition metal such as Fe, Cu, Ni, or Cr is contained, the content thereof is preferably 1% by mass or less. Due to this, long-term reliability and heat dissipation in high temperature environments can be dramatically improved. The resin layer may be reinforced with a metal layer. The resin layer may be formed of a polymer such as polypropylene (PP), polyethylene (PE), nylon, or polyethylene terephthalate (PET).

The thickness of the laminate film forming the container member is preferably 0.5 mm or less, and more preferably 0.2 mm or less. The laminate film can be molded into a desired shape by heat sealing.

The metal container may be formed on aluminum, aluminum alloy, iron, or stainless steel. The aluminum alloy preferably contains an element such as Mg, Zn, or Si. When a transition metal such as Fe, Cu, Ni, or Cr is contained in the alloy, the content thereof is preferably 1% by mass or less. The thickness of the metal sheet forming the metal container is preferably 1 mm or less, more preferably 0.5 mm or less, and even more preferably 0.2 mm or less.

(g) Positive Electrode Terminal and Negative Electrode Terminal

The positive electrode terminal may be formed of a conductive material being electrically stable within the range from 3 V (vs. Li/Li$^+$) to 5 V (vs. Li/Li$^+$) with respect to lithium metal. The positive electrode terminal is preferably formed of aluminum or an aluminum alloy containing at least one element selected from the group consisting of Mg, Ti, Zn, Mn, Fe, Cu, and Si. In order to reduce contact resistance with the positive electrode current collector or the current collector of the electrode having the bipolar structure, the positive terminal is preferably formed of a material similar to that of the positive electrode current collector or the current collector.

The negative terminal may be formed of a conductive material being electrochemically stable within the range from 0.4 V (vs. Li/Li$^+$) to 3 V (vs. Li/Li$^+$). Examples of this material include aluminum and aluminum alloys containing at least one element selected from the group consisting of Mg, Ti, Zn, Mn, Fe, Cu, and Si. In order to reduce contact resistance with the negative electrode current collector or the current collector of the electrode having the bipolar structure, the negative terminal is preferably formed of a material similar to that of a negative electrode current collector or the current collector.

Next, specific examples of a nonaqueous electrolyte battery according to the second embodiment will be described with reference to the drawings.

First, a nonaqueous electrolyte battery as an example according to the second embodiment will be described with reference to FIGS. 3 and 4.

FIG. 3 is a schematic cross-sectional view of an example of a nonaqueous electrolyte battery according to a second embodiment. FIG. 4 is an enlarged cross-sectional view of an A portion in FIG. 3.

A battery 10 shown in FIGS. 3 and 4 includes a container member 4 and an electrode group 2 accommodated in the container member 4. Here, as the electrode group, there is used a wound (coiled) electrode group. The container member 4 has a bag-shape. The container member 4 also accommodates a nonaqueous electrolyte (not shown).

As shown in FIG. 4, the electrode group 2 includes a positive electrode 5 and a negative electrode 3. The electrode group 2 has a structure in which a stack has been spirally wound. The stack has a structure in which the positive electrode 5 and the negative electrode 3 were stacked, although not limited this structure. The wound electrode group 2 in a flat form is produced by spirally winding this stack so that a part of the negative electrode 3 is located in the outermost layer, and then hot-pressing the wound stack.

As shown in FIG. 4, the negative electrode 3 includes a negative electrode current collector 3a and a negative electrode active material-containing layer 3b. As shown in FIG. 4, a part of the negative electrode 3 located in the outermost layer has a configuration in which the negative electrode active material-containing layer 3b is provided on one surface which is the internal surface of the negative electrode current collector 3a. In the other portion of the negative electrode 3, the negative electrode active material-containing layer 3b is provided on each surface of the negative electrode current collector 3a.

As shown in FIG. 4, the positive electrode 5 includes a positive electrode current collector 5a, and positive electrode active material-containing layer 5b provided on each surface of the positive electrode current collector 5a.

As shown in FIG. 3, in the vicinity of the outer peripheral edge of the electrode group 2, a positive electrode terminal 6 is connected to the positive electrode current collector 5a. Furthermore, in the outermost layer, a negative electrode terminal 7 is connected to the negative electrode current collector 3a. The positive electrode terminal 6 and the negative electrode terminal 7 are extended out from the opening of the bag-shaped container member 4.

The nonaqueous electrolyte battery 10 shown in FIGS. 3 and 4 can be produced according to the following procedure, for example. First, the electrode group 2 is accommodated in a container member 4. Next, a nonaqueous electrolyte is injected into the container member 4 via an opening of container member 4 so that the electrode group 2 is impregnated with the nonaqueous electrolyte. After that, the opening of the container member 4 is heat-sealed while the positive electrode terminal 6 and the negative electrode terminal 7 is sandwiched between portions of the container member 4. The portions of the container member 4 are located in a part of the circumference of the container member 4 and face each other. Due to the heat-sealing, the wound electrode group 2 and the nonaqueous electrolyte are enclosed in the container member 4.

Another example of the nonaqueous electrolyte battery according to the second embodiment is described with reference to FIG. 5.

FIG. 5 is a schematic cross sectional view of the electrode group included in other example of the nonaqueous electrolyte battery according to the second embodiment.

The electrode group 2 shown in FIG. 5 includes five electrodes 1. The five electrodes 1 are stacked to constitute the electrode group 2.

The electrode 1 located at the top includes a current collector 1a, and a negative electrode active material-containing layer 3b provided on one surface of the current collector 1a. The electrode 1 located at the bottom includes the current collector 1a, and a positive electrode active material-containing layer 5b provided on one surface of the current collector 1a.

Each of three of the five electrodes 1 include, as shown in FIG. 5, a current collector 1a, a negative electrode active material-containing layer 3b provided on one surface of the current collector 1a, and a positive electrode active material-containing layer 5b provided on the other surface of the current collector 1a. More specifically, these three electrodes 1 have a bipolar structure.

Each of the five electrodes 1 shown in FIG. 5 is the electrode according to the first embodiment. In addition, each of the positive electrode active material-containing layer 5b and negative electrode active material-containing layer 3b included in each of the electrodes 1 has a similar structure to that of each of the positive electrode active material-containing layer 5b and negative electrode active material-containing layer 3b described above with reference to FIG. 4.

The three electrodes 1 having a bipolar structure are, as shown in FIG. 5, stacked in such a manner that the surface of the negative electrode active material-containing layer 3b and the surface of the positive electrode active material-containing layer 5b are in contact with each other, and thereby constitute a stack.

The electrode 1 located at the top is located on the stack of the three electrodes 1 each having the bipolar structure, in such a manner that the surface of the negative electrode active material-containing layer 3b of the top electrode 1 is in contact with the surface of the positive electrode active material-containing layer 5b of one electrode 1 having the bipolar structure, and the surface not carrying the negative electrode active material-containing layer 3b is exposed. A negative electrode terminal not shown may be connected to the current collector 1a of the electrode 1 located at the top.

On the other hand, the electrode 1 located at the bottom is located below the stack of the three electrode 1 each having the bipolar structure in such a manner that the surface of the positive electrode active material-containing layer 5b of the bottom electrode 1 is in contact with the surface of the negative electrode active material-containing layer 3b of other one electrode 1 having the bipolar structure, and the surface not carrying the positive electrode active material-containing layer 5b is exposed. A positive electrode terminal not shown may be connected to the current collector 1a of the electrode 1 located at the bottom.

The electrode group 2 shown in FIG. 5 may be accommodated in an container member not shown. The container member may further accommodate a nonaqueous electrolyte. The nonaqueous electrolyte may be held in the electrode group 2.

The nonaqueous electrolyte battery according to the second embodiment includes the electrode according to the first embodiment as a positive electrode and/or a negative electrode. Therefore, the nonaqueous electrolyte battery according to the second embodiment can exhibit excellent life performance.

(Third Embodiment)

According to a third embodiment, a battery pack is provided. The battery pack includes the nonaqueous electrolyte battery according to the second embodiment.

The battery pack according to the third embodiment can include one or more nonaqueous electrolyte batteries (unit cells) each according to the second embodiment described above. The nonaqueous electrolyte batteries can be electrically connected in series, in parallel, or with a combination of series connection and parallel connection. The nonaqueous electrolyte batteries can be electrically connected to constitute a battery module. The battery pack according to the third embodiment may include battery modules.

The battery pack according to the third embodiment may further include a protective circuit. The protective circuit has a function to control charge and discharge of the nonaqueous electrolyte battery. Alternatively, a circuit included in an equipment (for example, electronic devices, vehicles, and the like) where the battery pack serves as a power source may be used as the protective circuit for the battery pack.

Moreover, the battery pack according to the third embodiment may further include an external power distribution terminal. The external power distribution terminal is configured to externally output the current from the nonaqueous electrolyte battery, and to input the current to the nonaqueous electrolyte battery. In other words, when the battery pack is used as a power source, the current is externally provided via the external power distribution terminal. Also, when the battery pack is charged, the charging current (including regenerative energy caused by power of vehicles such as automobiles) is provided to the battery pack via the external power distribution terminal.

Next, a battery pack as an example according to the third embodiment will be described with reference to the drawings.

FIG. 6 is an exploded perspective view showing one example of a battery pack according to a third embodiment. FIG. 7 is a block diagram showing an electric circuit of the battery pack in FIG. 6.

A battery pack 20 shown in FIGS. 6 and 7 includes a plurality of unit cells 21. Each of the plurality of unit cells 21 is flat nonaqueous electrolyte battery 10 described with reference to FIGS. 3 and 4.

The plurality of unit cells 21 are stacked so that the positive electrode terminals 6 and the negative electrode terminals 7 extended outside are arranged in the same direction, and fastened with an adhesive tape 22 to constitute a battery module 23. The unit cells 21 are electrically connected to each other in series as shown in FIG. 7.

A printed wiring board 24 is arranged opposed to the side plane, from which the positive electrode terminals 6 and the negative electrode terminals 7 are extended, of the battery module 23. A thermistor 25, a protective circuit 26, and a power distribution terminal 27 to an external device are installed in the printed wiring board 24 as shown in FIG. 7. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 6 located at the bottom of the battery module 23 and the distal end of the lead 28 is inserted into a positive electrode-side connector 29 of the printed wiring board 24 so as to be electrically connected. An negative electrode-side lead 30 is connected to the negative electrode terminal 7 located at the top of the battery module 23 and the distal end of the lead 30 is inserted into an negative electrode-side connector 31 of the printed wiring board 24 so as to be electrically connected. The connectors 29 and 31 are connected to the protective circuit 26 through wiring 32 and 33 formed in the printed wiring board 24.

The thermistor 25 detects the temperature of the unit cells 21 and the detection signal is sent to the protective circuit 26. The protective circuit 26 can shut down a plus-side wiring 34a and a minus-side wiring 34b between the protective circuit 26 and the power distribution terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the unit cells 21 is detected. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of the battery pack 20 of FIGS. 6 and 7, wiring 35 for voltage detection is connected to each of the unit cells 21. Detection signals are sent to the protective circuit 26 through the wiring 35.

Protective sheets 36 including rubber or resin are arranged on three side planes of the battery module 23 except the side plane from which the positive electrode terminals 6 and the negative electrode terminals 7 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 6 and 7, the structure in which the unit cells 21 are connected to each other in series is shown. In order to increase the battery capacity, the unit cells may be connected to each other in parallel. Furthermore, the assembled battery packs can be connected to each other in series and/or in parallel.

The aspect of the battery pack according to the third embodiment may be appropriately changed depending on its application. The applications of the battery pack according to the third embodiment are preferably those for which cycle characteristics when large-current is taken out are desired. Specific examples of these applications include application as a battery of a digital camera, and application as a battery for a vehicle such as a two- or four-wheeled hybrid electric vehicle, a two- or four-wheeled electric vehicle and a power-assisted bicycle, applications as a stationary battery, and application as a battery for rail way car. Particularly preferably, the battery pack according to the third embodiment is used for a battery installed in a vehicle.

The battery pack according to the third embodiment includes the nonaqueous electrolyte battery according to the second embodiment. Therefore, the battery pack according to the third embodiment can exhibit excellent life performance.

(Fourth Embodiment)

According to a fourth embodiment, a vehicle is provided. The vehicle includes the battery pack according to the third embodiment.

In the vehicle according to the fourth embodiment, the battery pack is configured to, for example, recover a regenerative energy of a power of the vehicle.

Examples of the vehicle according to the fourth embodiment include, for example, two to four-wheeled hybrid electric automobiles, two to four-wheeled electric automobiles, electric assist bicycles, and rail way cars (for example, electric trains).

In the vehicle according to the fourth embodiment, the installing position of the battery pack is not limited. For example, if the battery pack is installed in an automobile, the battery pack may also be installed in engine room, rear parts of automobiles or under seats of the vehicle.

Next, an example of a vehicle according to the fourth embodiment will be described with reference to the drawings.

FIG. 8 is a schematic sectional view showing an example of the vehicle according to the fourth embodiment.

The vehicle 41 shown in FIG. 8 is an automobile. The automobile 41 includes a battery pack 42 installed in an engine room located in the front part of the automobile 42.

The vehicle according to the fourth embodiment includes the battery pack according to the third embodiment. Therefore, the vehicle according to the fourth embodiment can exhibit excellent life performance.

EXAMPLES

The above-described embodiments are further described below based on examples.

Example 1

In Example 1, the nonaqueous electrolyte battery of Example 1 was produced in the following manner.

(Production of Negative Electrode)

Firstly, as negative electrode active material particles, a powder of niobium titanium composite oxide ($Nb_2TiO_7$: NTO) having an average particle size $D_a$ of 1.5 µm ($D_{10}$=0.6 µm, $D_{50}$=1.5 µm (=$D_a$), $D_{90}$=6 µm, and particle size range: 0.5 µm to 20 µm) was provided. As the materials of the negative electrode active material-containing layer, there were used the particles of the negative electrode active material, a graphite powder having an average particle size of 6 µm as a conductive agent, and a powder of sodium salt of carboxymethylcellulose (CMC) and styrene-butadiene rubber (SBR) as binder.

Furthermore, as insulator particles, an alumina ($Al_2O_3$) powder having an average particle size of $D_i$ 0.06 µm ($D_{10}$=0.03 µm, $D_{50}$=0.06 µm (=$D_i$), $D_{90}$=0.12 µm, and particle size range: 0.01 µm to 0.15 µm) was provided.

The materials provided above were mixed in the following order at a mass ratio of NTO:graphite:CMC:SBR:$Al_2O_3$=85:5:1:1:8. Firstly, the sodium salt of carboxymethylcellulose was dissolved in pure water to obtain a CMC aqueous solution. Graphite was dispersed in the CMC aqueous solution. Subsequently, $Nb_2TiO_7$ powder was dispersed in the dispersion. Subsequently, $Al_2O_3$ was dispersed in the dispersion. Finally, styrene-butadiene rubber was mixed with the dispersion, and a slurry of the negative electrode material was obtained. The volume ratio of NTO:$Al_2O_3$ in the slurry was 1:10.

The slurry thus obtained was applied to one surface of the aluminum foil as a negative electrode current collector having a thickness of 15 µm and an average crystal particle size of 30 µm. At that time, the slurry was not applied to a part of the surface of the negative electrode current collector.

The negative electrode current collector coated with the slurry of the negative electrode material was introduced into a drying furnace while the surface coated with the slurry was upward. In the drying furnace, rapid drying was carried out in the first zone for one minute at a temperature of 150° C. Migration was caused in the slurry by the rapid heating. In the remaining zone of the drying furnace, drying was carried out at 100° C. for 3 minutes. In this manner, a negative electrode active material-containing layer was obtained, the layer being provided on one surface of the negative electrode current collector, and the volume ratio of the insulator particles decreasing from the surface toward the current collector side.

Next, the negative electrode current collector was taken out from the drying furnace. Subsequently, the slurry of the negative electrode material, which was previously prepared, was applied to another surface of the negative electrode current collector. At that time, the slurry was not applied to the part of the surface of the negative electrode current collector not previously coated with the slurry.

Subsequently, the negative electrode current collector was introduced into the drying furnace while the surface coated with the slurry was upward. Subsequently, drying was carried out in the same manner as described above.

Next, the negative electrode current collector was taken out from the drying furnace. Subsequently, the current collector taken out was subjected to pressing. The pressing pressure was adjusted in such a manner that the electrode stack excluding the current collector (negative electrode active material-containing layer) had a density of 2.5 g/cm³.

In this manner, a negative electrode including a negative electrode current collector, and negative electrode active material-containing layers provided on both sides of the negative electrode current collector was obtained, wherein the volume percent of the insulator particles decrease from the surface toward the current collector. The negative electrode current collector included a negative electrode tab not carrying the negative electrode active material-containing layer.

(Production of Positive Electrode)

As positive electrode active material particles, a powder of lithium nickel cobalt manganese composite oxide ($LiNi_{0.5}Co_{0.2}Mn_{0.3}O_2$: NCM) having an average particle size $D_a$ of 4 µm ($D_{10}$=2 µm, $D_{50}$=4 µm (=$D_a$), $D_{90}$=10 µm, particle size range: 0.5 µm to 50 µm) was provided. As the materials of the positive electrode layer, this positive electrode active material, a graphite powder as conductive agent having an average particle size of 6 µm, and polyvinylidene fluoride (PVdF)) as a binder were used.

The materials provided as described above were mixed in the following order at a mass ratio NCM:graphite:PVdF=100:5:3. Firstly, PVdF was dissolved in N-methyl-2-pyrrolidone, graphite was dispersed therein, to prepare a dispersion. Subsequently, an NCM powder was mixed and dispersed in the dispersion to prepare a mixed solution. Subsequently, N-methyl-2-pyrrolidone was further added to adjust the solid content concentration of the mixed solution at 60% to obtain a slurry of the positive electrode material.

The slurry thus obtained was applied to the both surfaces of aluminum foil, as a positive electrode current collector, having a thickness of 15 µm and an average crystal particle size of 30 µm. At that time, the slurry was not applied to a part of the surface of the positive electrode current collector.

Subsequently, the coating film was dried. Finally, the dried coating film was subjected to pressing, thus obtaining a positive electrode including a positive electrode current collector, and positive electrode active material-containing layers provided on both surfaces of the positive electrode current collector. The positive electrode current collector included a positive electrode active material-containing layer not carrying the positive electrode tab. The density of the positive electrode active material-containing layer was 3.0 g/cm$^3$.

(Manufacturing of Electrode Group)

From the negative electrode produced as described above, ten negative electrodes having a size of 10×5 cm excluding the negative electrode tab were cut out. Each negative electrode included a negative electrode tab protruding from one side. In the same manner, ten positive electrodes having a similar size were cut out from the positive electrode. Each positive electrode included a positive electrode tab protruding from one side.

These negative and positive electrodes were stacked alternately in such a manner that the positive electrode active material-containing layer and negative electrode active material-containing layer are opposed to each other, thereby obtaining a stack. At that time, ten negative electrode tabs were protruded from one face of the stack, and ten positive electrode tabs were protruded from another face. In this stack, the surface from which the negative electrode tabs were protruded and the surface from which the positive electrode tabs were protruded were back to back. Subsequently, the ten negative electrode tabs were altogether welded to the negative electrode external terminal by ultrasonic welding. In the same manner, the ten positive electrode tabs were altogether welded to the positive electrode external terminal by ultrasonic welding. An electrode group was thus obtained.

(Production of Nonaqueous Electrolyte Battery)

Subsequently, the electrode group thus obtained was accommodated in a laminate cup. Subsequently, the peripheral portion of the laminate cup was heat-sealed except a part while a part of the positive electrode external terminal and a part of the negative electrode external terminal were located outside the laminate cup.

Subsequently, the laminate type cell in this state was dried at 100° C. overnight.

On the other hand, a nonaqueous electrolyte was prepared in the following manner. Firstly, ethylene carbonate and diethyl carbonate were mixed at a volume ratio of 1:2 in a glove box to prepare a mixed solvent. Lithium hexafluorophosphate (LiPF$_6$) were dissolved in the mixed solvent at a concentration of 1 mol/L to prepare a nonaqueous electrolyte solution.

25 mL of the liquid electrolyte was poured into the laminate cup, which had been dried overnight, and the electrode group was impregnated with the liquid electrolyte. Thereafter, the part of the peripheral of the laminate cup that had not been heat-sealed was heat-sealed, whereby the electrode group and the liquid nonaqueous electrolyte were enclosed in the laminate cup.

Thus, the nonaqueous electrolyte battery of Example 1 was made.

Examples 2 to 12

In Examples 2 to 12, the nonaqueous electrolyte batteries of Example 2 to 12 were produced in the same manner as in Example 1, except that the negative electrode active material particles and/or insulator particles were replaced with those listed in Table 1.

Example 13

In Example 13, the nonaqueous electrolyte battery of Example 13 was made by the following method.

(Production of Negative Electrode)

Firstly, as negative electrode active material particles, the powder of niobium titanium composite oxide (Nb$_2$TiO$_7$: NTO) having an average particle size D$_a$ of 5 µm (D$_{10}$=1 µm, D$_{50}$=5 µm (=D$_a$) D$_{90}$=15 µm, and particle size range: 0.8 µm to 50 µm) was provided. As the materials of the negative electrode layer, the particles of the negative electrode active material, graphite powder as a conductive agent having an average particle size of 6 µm, and the powder of a sodium salt of carboxymethylcellulose (CMC) and styrene-butadiene rubber (SBR) as binder were used.

The materials provided above were mixed in the following order at a mass ratio of NTO:graphite:CMC:SBR=100:6:1:1. Firstly, the sodium salt of carboxymethylcellulose was dissolved in pure water to obtain a CMC aqueous solution. Graphite was dispersed in the CMC aqueous solution. Subsequently, Nb$_2$TiO$_7$ powder was dispersed in the dispersion. Finally, styrene-butadiene rubber was mixed with the dispersion to obtain a slurry of the negative electrode material.

The slurry thus obtained was applied to the both surfaces of aluminum foil as a negative electrode current collector having a thickness of 15 µm and an average crystal particle size of 30 µm. At that time, the slurry was not applied to a part of the surface of the negative electrode current collector.

Subsequently, the coated film was dried. Finally, the dried coated film was subjected to pressing, thus obtaining a negative electrode including a negative electrode current collector, and negative electrode active material-containing layers provided on both surfaces of the negative electrode current collector. The negative electrode current collector included a negative electrode active material-containing layer not carrying the negative electrode tab. The density of the negative electrode active material-containing layer was 2.5 g/cm$^3$.

(Production of Positive Electrode)

Firstly, as positive electrode active material particles, a powder of lithium nickel cobalt manganese composite oxide (LiNi$_{0.5}$Co$_{0.2}$Mn$_{0.3}$O$_2$: NCM) (D$_{10}$=0.6 µm, D$_{50}$=1.2 µm (=D$_a$), D$_{90}$=3 µm, particle size range: 0.5 µm to 6 µm) was provided. As the materials of the positive electrode layer, the positive electrode active material, a graphite powder having an average particle size of 6 µm as a conductive agent, and polyvinylidene fluoride (PVdF) as a binding material were used.

Furthermore, as insulator particles, an alumina ($Al_2O_3$) powder having an average particle size of $D_i$ 0.06 µm ($D_{10}$=0.03 µm, $D_{50}$=0.06 µm (=$D_i$), $D_{90}$=0.12 µm, and particle size range: 0.01 µm to 0.15 µm) was provided.

The materials provided above were mixed in the following order at a mass ratio of NCM:graphite:PVdF:$Al_2O_3$=100:5:3:10. Firstly, PVdF was dissolved in N-methyl-2-pyrrolidone, and graphite was dispersed therein to obtain a dispersion. Subsequently, the powders of NCM and $Al_2O_3$ were mixed and dispersed in the dispersion to obtain a mixed liquid. Subsequently, N-methyl-2-pyrrolidone was further added to adjust the solid content concentration of the mixed solution to 60% to obtain a slurry of a positive electrode material.

The slurry thus obtained was applied to one surface of the aluminum foil, as a positive electrode current, collector having a thickness of 15 µm and an average crystal particle size of 30 µm. At that time, the slurry was not applied to a part of the surface of the positive electrode current collector.

The positive electrode current collector coated with the slurry of the positive electrode material was introduced into a drying furnace while the surface coated with the slurry was upward. In the drying furnace, rapid drying was carried out in the first zone for one minute at a temperature of 150° C. Migration was caused in the slurry by the rapid heating. In the remaining zone of the drying furnace, drying was carried out at 130° C. for 2 minutes. In this manner, a positive electrode active material-containing layer was obtained, the layer being provided on one surface of the positive electrode current collector, and the volume ratio of the insulator particles decreasing from the surface toward the current collector.

Next, the positive electrode current collector was taken out from the drying furnace. Subsequently, the slurry of the positive electrode material, which was previously prepared, was applied to another surface of the positive electrode current collector. At that time, the slurry was not applied to the part of the surface of the positive electrode current collector not previously coated with the slurry.

Subsequently, the positive electrode current collector was introduced into the drying furnace while the surface coated with the slurry was upward. Subsequently, drying was carried out in the same manner as described above.

Next, the positive electrode current collector was taken out from the drying furnace. Subsequently, the current collector taken out was subjected to pressing. The pressing pressure was adjusted in such a manner that the electrode laminate excluding the current collector had a density of 3.0 g/cm³.

In this manner, a positive electrode including a positive electrode current collector and positive electrode active material-containing layers provided on both sides of the positive electrode current collector were obtained, the volume ratio of the insulator particles in the positive electrode active material-containing layers decreasing from the surface toward the current collector. The positive electrode current collector included the positive electrode tab not carrying the positive electrode active material-containing layer.

(Production of Nonaqueous Electrolyte Battery)

In Example 13, the nonaqueous electrolyte battery of Example 13 was produced in the same manner as in Example 1, except that ten negative electrodes were cut out from the negative electrode which had been produced as described above, and ten positive electrodes were cut out from the positive electrode which had been produced as described above. The positive and negative electrodes were cut in the same manner as in Example 1.

Example 14 to 22

In Examples 14 to 22, the nonaqueous electrolyte batteries of Examples 14 to 22 were produced in the same manner as in Example 13, except that the positive electrode active material particles and/or insulator particles were replaced with those listed in Table 2.

Example 23

In Example 23, the nonaqueous electrolyte battery of Example 23 was produced in the same manner as in Example 1, except that the negative electrode was produced in the same manner as in Example 2, and the positive electrode was produced in the same manner as in Example 15.

Comparative Example 1

In Comparative Example 1, the nonaqueous electrolyte battery of Comparative Example 1 was produced in the same manner as in Example 2, except that the negative electrode was produced in the same manner as in Example 14.

Comparative Example 2

In Comparative Example 2, the nonaqueous electrolyte battery of Comparative Example 2 was produced in the same manner as in Example 2, except that the negative and positive electrodes were produced in the following manner.

In Comparative Example 2, the negative electrode was produced in the same manner as in Example 2, except that, in producing of the negative electrode, rapid heating at 130° C. was not carried out in the first zone of the drying furnace.

In Comparative Example 2, the positive electrode was produced in the same manner as in Example 14, except that, in producing of the positive electrode, rapid heating at 130° C. was not carried out in the first zone of the drying furnace.

Comparative Example 3

In Comparative Example 3, the nonaqueous electrolyte battery of Comparative Example 3 was produced in the same manner as in Example 2, except that the negative electrode was produced in the following manner.

(Producing of Negative Electrode)

In summary, in Comparative Example 3, negative electrode active material-containing layers were produced on both surfaces of the negative electrode current collector in the same manner as in Example 13, and a slurry of a coating type separator, which had been prepared in the following manner, was applied to the surface of the negative electrode active material-containing layer.

(Producing of Negative Electrode)

Firstly, a slurry of the negative electrode material was obtained in the same manner as in Example 13. The slurry thus obtained was applied to the both surfaces of aluminum foil, as a negative electrode current collector, having a thickness of 15 µm and an average crystal particle size of 30 µm. At that time, the slurry was not applied to a part of the surface of the negative electrode current collector. Subsequently, the coated film was dried to obtain a negative electrode including a negative electrode current collector, and negative electrode active material-containing layers provided on both surfaces of the negative electrode current collector.

(Preparation of Slurry of Insulator Particles)

As the particles of the insulator, an alumina ($Al_2O_3$) powder having an average particle size $D_i$ of 0.06 μm ($D_{10}$=0.03 μm, $D_{50}$=0.06 μm (=Di), $D_{90}$=0.12 μm, and particle size range: 0.01 μm to 0.15 μm) was provided. In addition, polyvinylidene fluoride (PVdF) as a binder was provided. The materials provided above were dispersed into N-methyl-2-pyrrolidone (NMP) in the following manner at a mass ratio of PVdF:$Al_2O_3$=1:3.33. Firstly, PVdF was dissolved in NMP, the $Al_2O_3$ powder was dispersed therein to obtain a mixed solution. Subsequently, N-methyl-2-pyrrolidone was further added to adjust the solid content concentration of the mixed solution at 30% to obtain a slurry for a coating type separator. The negative electrode active material-containing layer includes an aqueous SBR binder, so that a solvent PVdF binder, which will not dissolve the negative electrode active material-containing layer, was used in the slurry of the insulator.

(Formation of Coating type Separator)

The slurry thus obtained was applied to the surface of one of the negative electrode active material-containing layers of the negative electrode, which had been produced above.

The negative electrode coated with the slurry of the insulator particles was introduced into a drying furnace while the surface coated with the slurry was upward. In the drying furnace, drying was carried out at a constant temperature of 130° C. from the first zone to the final zone. In this manner, a negative electrode having a coating type separator layer on one surface of the negative electrode active material-containing layer was obtained.

Next, the negative electrode was taken out from the drying furnace. Subsequently, the slurry of the insulator particles, which had been prepared above, was applied to the surface of another negative electrode active material-containing layer of the negative electrode thus taken out.

Subsequently, the negative electrode was introduced into the drying furnace while the surface coated with the slurry was upward. Subsequently, drying was carried out in the same manner as described above.

Next, the negative electrode was taken out from the drying furnace. Subsequently, the negative electrode thus taken out was subjected to pressing. The pressing pressure was adjusted in such a manner that the electrode stack excluding the current collector (negative electrode active material-containing layer) had a density of 2.5 g/cm³.

In this manner, a negative electrode current collector, the negative electrode active material-containing layers provided on both sides of the negative electrode current collector, and coating type separator layers provided on the surfaces of the negative electrode active material-containing layers were obtained. The negative electrode current collector included a negative electrode tab carrying no negative electrode active material-containing layer.

(Producing of Nonaqueous Electrolyte Battery)

In Comparative Example 3, the nonaqueous electrolyte battery of Comparative Example 3 was produced in the same manner as in Example 1, except that ten negative electrodes were cut out from the negative electrode which had been produced as described above, and ten positive electrodes were cut out from the positive electrode which had been produced as described above. The negative and positive electrodes were cut out in the same manner as in Example 1.

TABLE 1

| | Negative Electrode Active Material Particles | | | | | Insulator Particles | | | | | Volume Ratio of Active Material Particles: Insulator Particles |
|---|---|---|---|---|---|---|---|---|---|---|---|
| | Composition of Active Material | $D_{10}$ (μm) | $D_{50}$ (μm) | $D_{90}$ (μm) | Range of Particle Size (μm) | Composition | $D_{10}$ (μm) | $D_{50}$ (μm) | $D_{90}$ (μm) | Range of Particle size (μm) | |
| Example 1 | $Nb_2TiO_7$ | 0.6 | 1.5 | 6 | 0.5~20 | $Al_2O_3$ | 0.03 | 0.06 | 0.12 | 0.01~0.15 | 1:10 |
| Example 2 | $Nb_2TiO_7$ | 1 | 5 | 15 | 0.8~50 | $Al_2O_3$ | 0.03 | 0.06 | 0.12 | 0.01~0.15 | 1:10 |
| Example 3 | $Nb_2TiO_7$ | 10 | 20 | 80 | 5~100 | $Al_2O_3$ | 0.03 | 0.06 | 0.12 | 0.01~0.15 | 1:10 |
| Example 4 | $Nb_2TiO_7$ | 0.6 | 1.5 | 6 | 0.5~20 | $Li_7La_3Zr_2O_{12}$ | 0.05 | 0.07 | 0.13 | 0.03~0.15 | 1:10 |
| Example 5 | $Nb_2TiO_7$ | 1 | 5 | 15 | 0.8~50 | $Li_7La_3Zr_2O_{12}$ | 0.05 | 0.07 | 0.13 | 0.03~0.15 | 1:10 |
| Example 6 | $Nb_2TiO_7$ | 10 | 20 | 80 | 5~100 | $Li_7La_3Zr_2O_{12}$ | 0.05 | 0.07 | 0.13 | 0.03~0.15 | 1:10 |
| Example 7 | $Nb_2TiO_7$ | 0.6 | 1.5 | 6 | 0.5~20 | $BaTiO_3$ | 0.04 | 0.06 | 0.13 | 0.02~0.15 | 1:10 |
| Example 8 | $Nb_2TiO_7$ | 1 | 5 | 15 | 0.8~50 | $BaTiO_3$ | 0.04 | 0.06 | 0.13 | 0.02~0.15 | 1:10 |
| Example 9 | $Nb_2TiO_7$ | 10 | 20 | 80 | 5~100 | $BaTiO_3$ | 0.04 | 0.06 | 0.13 | 0.02~0.15 | 1:10 |
| Example 10 | $Li_4Ti_5O_{12}$ | 1 | 5 | 40 | 0.5~60 | $Al_2O_3$ | 0.03 | 0.06 | 0.12 | 0.01~0.15 | 1:10 |
| Example 11 | $Li_2Na_{1.5}Ti_{6.5}Nb_{0.5}O_{14}$ | 1 | 5 | 50 | 0.5~80 | $Al_2O_3$ | 0.03 | 0.06 | 0.12 | 0.01~0.15 | 1:10 |
| Example 12 | $TiO_2(B)$ | 1 | 10 | 100 | 0.5~150 | $Al_2O_3$ | 0.03 | 0.06 | 0.12 | 0.01~0.15 | 1:10 |
| Example 13 | $Nb_2TiO_7$ | 1 | 5 | 15 | 0.8~50 | — | — | — | — | — | — |
| Example 14 | $Nb_2TiO_7$ | 1 | 5 | 15 | 0.8~50 | — | — | — | — | — | — |
| Example 15 | $Nb_2TiO_7$ | 1 | 5 | 15 | 0.8~50 | — | — | — | — | — | — |
| Example 16 | $Nb_2TiO_7$ | 1 | 5 | 15 | 0.8~50 | — | — | — | — | — | — |
| Example 17 | $Nb_2TiO_7$ | 1 | 5 | 15 | 0.8~50 | — | — | — | — | — | — |
| Example 18 | $Nb_2TiO_7$ | 1 | 5 | 15 | 0.8~50 | — | — | — | — | — | — |
| Example 19 | $Nb_2TiO_7$ | 1 | 5 | 15 | 0.8~50 | — | — | — | — | — | — |
| Example 20 | $Nb_2TiO_7$ | 1 | 5 | 15 | 0.8~50 | — | — | — | — | — | — |
| Example 21 | $Nb_2TiO_7$ | 1 | 5 | 15 | 0.8~50 | — | — | — | — | — | — |
| Example 22 | $Nb_2TiO_7$ | 1 | 5 | 15 | 0.8~50 | — | — | — | — | — | — |
| Example 23 | $Nb_2TiO_7$ | 1 | 5 | 15 | 0.8~50 | $Al_2O_3$ | 0.03 | 0.06 | 0.12 | 0.01~0.15 | 1:10 |
| Comparative Example 1 | $Nb_2TiO_7$ | 1 | 5 | 15 | 0.8~50 | — | — | — | — | — | — |
| Comparative Example 2 | $Nb_2TiO_7$ | 1 | 5 | 15 | 0.8~50 | $Al_2O_3$ | 0.03 | 0.06 | 0.12 | 0.01~0.10 | 1:10 |

TABLE 1-continued

| | Negative Electrode Active Material Particles | | | | | Insulator Particles | | | | | Volume Ratio of Active Material Particles: Insulator Particles |
|---|---|---|---|---|---|---|---|---|---|---|---|
| | Composition of Active Material | $D_{10}$ (μm) | $D_{50}$ (μm) | $D_{90}$ (μm) | Range of Particle Size (μm) | Composition | $D_{10}$ (μm) | $D_{50}$ (μm) | $D_{90}$ (μm) | Range of Particle size (μm) | |
| Comparative Example 3 | $Nb_2TiO_7$ | 1 | 5 | 15 | 0.8~50 | Coated $Al_2O_3$ | 0.03 | 0.06 | 0.12 | 0.01~0.10 | (1:10) |

TABLE 2

| | Positive Electrode Active Material Particles | | | | | Insulator Particles | | | | | Volume Ratio of Active Material Particles: Insulator Particles |
|---|---|---|---|---|---|---|---|---|---|---|---|
| | Composition of Active Material | $D_{10}$ (μm) | $D_{50}$ (μm) | $D_{90}$ (μm) | Range of Particle Size (μm) | Composition | $D_{10}$ (μm) | $D_{50}$ (μm) | $D_{90}$ (μm) | Range of Particle Size (μm) | |
| Example 1 | $LiNi_{0.5}Co_{0.2}Mn_{0.3}O_2$ | 2 | 4 | 10 | 0.5~50 | — | — | — | — | — | — |
| Example 2 | $LiNi_{0.5}Co_{0.2}Mn_{0.3}O_2$ | 2 | 4 | 10 | 0.5~50 | — | — | — | — | — | — |
| Example 3 | $LiNi_{0.5}Co_{0.2}Mn_{0.3}O_2$ | 2 | 4 | 10 | 0.5~50 | — | — | — | — | — | — |
| Example 4 | $LiNi_{0.5}Co_{0.2}Mn_{0.3}O_2$ | 2 | 4 | 10 | 0.5~50 | — | — | — | — | — | — |
| Example 5 | $LiNi_{0.5}Co_{0.2}Mn_{0.3}O_2$ | 2 | 4 | 10 | 0.5~50 | — | — | — | — | — | — |
| Example 6 | $LiNi_{0.5}Co_{0.2}Mn_{0.3}O_2$ | 2 | 4 | 10 | 0.5~50 | — | — | — | — | — | — |
| Example 7 | $LiNi_{0.5}Co_{0.2}Mn_{0.3}O_2$ | 2 | 4 | 10 | 0.5~50 | — | — | — | — | — | — |
| Example 8 | $LiNi_{0.5}Co_{0.2}Mn_{0.3}O_2$ | 2 | 4 | 10 | 0.5~50 | — | — | — | — | — | — |
| Example 9 | $LiNi_{0.5}Co_{0.2}Mn_{0.3}O_2$ | 2 | 4 | 10 | 0.5~50 | — | — | — | — | — | — |
| Example 10 | $LiNi_{0.5}Co_{0.2}Mn_{0.3}O_2$ | 2 | 4 | 10 | 0.5~50 | — | — | — | — | — | — |
| Example 11 | $LiNi_{0.5}Co_{0.2}Mn_{0.3}O_2$ | 2 | 4 | 10 | 0.5~50 | — | — | — | — | — | — |
| Example 12 | $LiNi_{0.5}Co_{0.2}Mn_{0.3}O_2$ | 2 | 4 | 10 | 0.5~50 | — | — | — | — | — | — |
| Example 13 | $LiNi_{0.5}Co_{0.2}Mn_{0.3}O_2$ | 0.6 | 1.2 | 3 | 0.5~6 | $Al_2O_3$ | 0.03 | 0.06 | 0.12 | 0.01~0.15 | 1:10 |
| Example 14 | $LiNi_{0.5}Co_{0.2}Mn_{0.3}O_2$ | 2 | 4 | 10 | 1~20 | $Al_2O_3$ | 0.03 | 0.06 | 0.12 | 0.01~0.15 | 1:10 |
| Example 15 | $LiNi_{0.5}Co_{0.2}Mn_{0.3}O_2$ | 7 | 15 | 80 | 5~100 | $Al_2O_3$ | 0.03 | 0.06 | 0.12 | 0.01~0.15 | 1:10 |
| Example 16 | $LiNi_{0.5}Co_{0.2}Mn_{0.3}O_2$ | 0.6 | 1.2 | 3 | 0.5~6 | $Li_7La_3Zr_2O_{12}$ | 0.07 | 0.05 | 0.13 | 0.03~0.15 | 1:10 |
| Example 17 | $LiNi_{0.5}Co_{0.2}Mn_{0.3}O_2$ | 2 | 4 | 10 | 1~20 | $Li_7La_3Zr_2O_{12}$ | 0.05 | 0.07 | 0.13 | 0.03~0.15 | 1:10 |
| Example 18 | $LiNi_{0.5}Co_{0.2}Mn_{0.3}O_2$ | 7 | 15 | 80 | 5~100 | $Li_7La_3Zr_2O_{12}$ | 0.05 | 0.07 | 0.13 | 0.03~0.15 | 1:10 |
| Example 19 | $LiNi_{0.5}Co_{0.2}Mn_{0.3}O_2$ | 0.6 | 1.2 | 3 | 0.5~6 | $BaTiO_3$ | 0.04 | 0.06 | 0.13 | 0.02~0.15 | 1:10 |
| Example 20 | $LiNi_{0.5}Co_{0.2}Mn_{0.3}O_2$ | 2 | 4 | 10 | 1~20 | $BaTiO_3$ | 0.04 | 0.06 | 0.13 | 0.02~0.15 | 1:10 |
| Example 21 | $LiNi_{0.5}Co_{0.2}Mn_{0.3}O_2$ | 7 | 15 | 80 | 5~100 | $BaTiO_3$ | 0.04 | 0.06 | 0.13 | 0.02~0.15 | 1:10 |
| Example 22 | $LiMn_2O_4$ | 5 | 10 | 30 | 3~40 | $Al_2O_3$ | 0.03 | 0.06 | 0.12 | 0.01~0.15 | 1:10 |
| Example 23 | $LiNi_{0.5}Co_{0.2}Mn_{0.3}O_2$ | 7 | 15 | 80 | 5~100 | $Al_2O_3$ | 0.03 | 0.06 | 0.12 | 0.01~0.15 | 1:10 |
| Comparative Example 1 | $LiNi_{0.5}Co_{0.2}Mn_{0.3}O_2$ | 2 | 4 | 10 | 0.5~50 | — | — | — | — | — | — |
| Comparative Example 2 | $LiNi_{0.5}Co_{0.2}Mn_{0.3}O_2$ | 2 | 4 | 10 | 0.5~50 | $Al_2O_3$ | 0.03 | 0.06 | 0.12 | 0.01~0.10 | 1:10 |
| Comparative Example 3 | $LiNi_{0.5}Co_{0.2}Mn_{0.3}O_2$ | 2 | 4 | 10 | 0.5~50 | — | — | — | — | — | — |

(Life Performance Test)

The nonaqueous electrolyte batteries of Examples and Comparative Examples were placed in a thermostat bath at 45° C., and subjected to cycle life characteristics evaluation. In the cycle test, one cycle included charge at 1 C and discharge at 1 C, and the discharge capacity was measured at each discharge. After each charge and discharge, the nonaqueous electrolyte batteries were allowed to stand for 10 minutes.

Table 3 shows the capacity retention ratio after 100 cycles of the nonaqueous electrolyte batteries of Examples and Comparative Examples.

TABLE 3

| | Capacity Retention Ratio after 100 cycles (%) |
|---|---|
| Example 1 | 85 |
| Example 2 | 95 |
| Example 3 | 93 |
| Example 4 | 83 |
| Example 5 | 90 |
| Example 6 | 87 |
| Example 7 | 82 |
| Example 8 | 86 |
| Example 9 | 86 |
| Example 10 | 98 |
| Example 11 | 95 |
| Example 12 | 86 |
| Example 13 | 84 |
| Example 14 | 90 |

TABLE 3-continued

| | Capacity Retention Ratio after 100 cycles (%) |
|---|---|
| Example 15 | 88 |
| Example 16 | 83 |
| Example 17 | 89 |
| Example 18 | 85 |
| Example 19 | 82 |
| Example 20 | 88 |
| Example 21 | 83 |
| Example 22 | 86 |
| Example 23 | 97 |
| Comparative Example 1 | Occurrence of Short Circuit |
| Comparative Example 2 | Occurrence of Short Circuit |
| Comparative Example 3 | 69 |

(Analysis of Positive and Negative Electrodes)

The negative electrode and the positive electrode of the nonaqueous electrolyte batteries of Examples and Comparative Examples were subjected to the above-explained measurement.

The results of the measurement indicate that, in each of the negative electrodes of the nonaqueous electrolyte batteries of Examples 1 to 12 and 23, the volume ratio of the insulator particles in the negative electrode active material-containing layer decreased from the second face in contact with the positive electrode toward the first face facing to the current collector. In addition, in the negative electrode active material-containing layer of each negative electrode of the nonaqueous electrolyte batteries of Examples 1 to 12 and 23, the insulator particles were present even in the part far from the second face at a distance T'. The distance T' corresponded to 40% to 50% of the thickness T of the negative electrode active material-containing layer. On the other hand, the positive electrode active material-containing layer of each positive electrode of the nonaqueous electrolyte batteries of Examples 1 to 12 did not include insulator particles, so that the volume ratio of the insulator particles was 0 irrespective of location.

In each of the positive electrodes of the nonaqueous electrolyte batteries of Examples 13 to 22 and 23, in the positive electrode active material-containing layer, the volume ratio of the insulator particles decreased from the second face in contact with the negative electrode toward the first face opposed to the current collector. In addition, in the positive electrode active material-containing layers of the positive electrode of each of the nonaqueous electrolyte batteries of Examples 13 to 22 and 23, insulator particles were present even in the part apart from the second face at a distance T'. The distance T' corresponded to 30% to 40% the length of the thickness T of the positive electrode active material-containing layer. On the other hand, the insulator particles were not present in the negative electrode active material-containing layers of the negative electrodes in the nonaqueous electrolyte batteries of Examples 13 to 22, so that the volume ratio of the insulator particles was 0 regardless of the location.

In the nonaqueous electrolyte battery of Comparative Example 1, the insulator particles were not included in either of the negative electrode active material-containing layer or positive electrode active material-containing layer.

The insulator particles were present evenly in the negative electrode active material-containing layers of the negative electrode in the nonaqueous electrolyte battery of Comparative Example 2, and the volume ratio of the insulator particles did not decrease from the second face in contact with the positive electrode toward the first face facing to the current collector. In addition, in the positive electrode active material-containing layers of the positive electrode in the nonaqueous electrolyte battery of Comparative Example 2, the insulator particles were evenly present, and the volume ratio of the insulator particles did not decrease from the second face in contact with the negative electrode toward the first face facing to the current collector.

Alumina as the insulator particles was present on the surface of the negative electrode active material-containing layers of the nonaqueous electrolyte battery of Comparative Example 3. However, the insulator particles were not present in the negative electrode active material-containing layers of the nonaqueous electrolyte battery of Comparative Example 3.

<Result>

The result of the life performance test indicates that the nonaqueous electrolyte batteries of Comparative Examples 1 and 2 are not usable as batteries, because a short circuit (electrical short circuit) occurred between the positive and negative electrodes. In particular, in the nonaqueous electrolyte battery of Comparative Example 2, the insulator particles were included in both of the positive and negative electrodes. However, as described above, it is considered that in the nonaqueous electrolyte battery of Comparative Example 2, the insulator particles were evenly present in both of the positive and negative electrode active material-containing layers, sufficient prevention of short circuit cannot be exerted.

No short circuit (electrical short circuit) occurred in the nonaqueous electrolyte battery of Comparative Example 3. However, it is considered that in the nonaqueous electrolyte battery of Comparative Example 3, the binder of the negative electrode active material-containing layer and the binder of the coating type separator layer were separate, which likely caused poor interface adhesion. In addition, it is considered that in the nonaqueous electrolyte battery of Comparative Example 3, diffusion of the separator material into the negative electrode active material-containing layer did not occur, which likely caused insufficient prevention of the side reaction between the nonaqueous electrolyte and the surface of the negative electrode active material particles included in the negative electrode active material-containing layer excluding the surface, in particular the part closer to the surface, and this resulted in electrochemical reaction between the negative electrode active material particles and the nonaqueous electrolyte to decompose the liquid electrolyte. In addition, in Comparative Example 3, in order to form coating type separator layers on the two surfaces of the negative electrode, the negative electrode current collector was loaded in the drying furnace four times in total for drying the slurries of the negative electrode material and insulator. The four times of heating and the tension of roll to roll applied to the negative electrode current collector made the negative electrode current collector easy to be drawn, decreased the interface jointing force between the negative electrode current collector and the negative electrode active material-containing layer, and decreased the peel strength of the negative electrode active material-containing layer. It is consider that due to these, the nonaqueous electrolyte battery of Comparative Example 3 could not exhibit sufficient battery performance, specifically excellent life performance. In addition, it is considered that the influence of a total of four times of heating in the drying furnace decreased the strength of the negative electrode current collector itself.

On the other hand, the capacity retention ratio of the nonaqueous electrolyte batteries of Examples 1 to 23 exceeded 80%. More specifically, the nonaqueous electrolyte batteries of Examples 1 to 23 exhibited excellent life performance.

According to one or more embodiments and Examples described above, an electrode is provided. The electrode includes an active material-containing layer. The active material-containing layer includes active material particles and insulator particles. The second face of the active material-containing layer as the surface of the active material-containing layer includes at least a part of the insulator particles. A volume ratio of the insulator particles decreases from the second face toward the first face in the active material-containing layer. The insulator particles, which have a gradient of the volume ratio in the active material-containing layer, can suppress side-reaction between the active material particles and other components as well as can make load on the active material-containing layer uniform. As a result, the electrode can achieve a nonaqueous electrolyte battery which can exhibit excellent life performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
    a current collector; and
    an active material-containing layer which is provided on the current collector and comprises active material particles and insulator particles,
    the active material-containing layer having a first face facing the current collector and a second face as a surface of the active material-containing layer, the second face comprising a surface of a part of the insulator particles,
    wherein a volume ratio of the insulator particles decreases from the second face toward the first face in the active material-containing layer, and
    wherein the insulator particles are present in a region of the active material-containing layer from the second face up to a level in the active material-containing layer, and a distance from the first face to the level is $T_1$, and the distance $T_1$ is within the range of $0.01 \leq T_1/T \leq 0.9$, wherein T is a distance from the first face to the second face of the active material-containing layer, and
    wherein the average particle size of the insulator particles falls within a range from 10 nm to 70 nm.

2. The electrode according to claim 1, wherein the average particle size of the insulator particles is smaller than an average particle size of the active material particles.

3. The electrode according to claim 1, wherein the active material particles comprises active material particles having an operating potential of 0.4 V (vs. Li/Li$^+$) or more.

4. The electrode according to claim 1, wherein the active material particles comprise at least one kind of particles selected from the group consisting of particles of a lithium titanate having a spinel-type crystal structure, particles of a lithium titanate having a ramsdellite-type crystal structure, particles of a titanium oxide having an anatase-type crystal structure, particles of a titanium oxide having a monoclinic crystal structure, particles of a niobium titanium composite oxide having a monoclinic crystal structure, and particles of a niobium-containing composite oxide having an orthorhombic crystal structure.

5. The electrode according to claim 1, wherein the active material particles comprise at least one kind of particles selected from the group consisting of particles of a lithium manganese composite oxide, particles of a lithium nickel composite oxide, particles of a lithium cobalt composite oxide, particles of a lithium nickel cobalt composite oxide, particles of a lithium manganese cobalt composite oxide, particles of a lithium manganese nickel composite oxide having a spinel-type crystal structure, particles of a lithium iron phosphate, and particles of a lithium nickel cobalt manganese composite oxide.

6. The electrode according to claim 1, wherein the insulator particles comprise at least one kind of particles selected from the group consisting of particles of a titanium hydroxide, particles of a barium titanate, particles of an alumina, particles of a zirconia, particles of an aluminum hydroxide, particles of a boehmite, particles of a cordierite, particles of a magnesium oxide, particles of an aramid, particles of a magnesium hydroxide, particles of a sialon, particles of a lithium tetraborate, particles of a lithium tantalate, particles of a forsterite, particles of a steatite, particles of a mica, particles of a silicon nitride, particles of an aluminum nitride, particles of a mullite, particles of a ferrite, particles of a cellulose, and particles of a zeolite.

7. The electrode according to claim 1, wherein the insulator particles comprise particles of a solid electrolyte.

8. A nonaqueous electrolyte battery comprising:
    a negative electrode;
    a positive electrode; and
    a nonaqueous electrolyte,
    wherein at least one of the negative electrode and the positive electrode is the electrode according to claim 1.

9. A battery pack comprising the nonaqueous electrolyte battery according to claim 8.

10. The battery pack according to claim 9, further comprising:
    an external power distribution terminal; and
    a protective circuit.

11. A battery pack comprising nonaqueous electrolyte batteries each according to claim 8, wherein the nonaqueous electrolyte batteries are electrically connected in series, in parallel, or in combination of series and parallel.

12. A vehicle comprising the battery pack according to claim 9.

13. The vehicle according to claim 12, wherein the battery pack is configured to recover a regenerative energy of a power of the vehicle.

14. The electrode according to claim 1, wherein the distance $T_1$ is within a range of $0.1 \leq T_1/T \leq 0.9$.

15. The electrode according to claim 7, wherein the particles of the solid electrolyte are inorganic solid particles having Li-ion conductivity.

16. The electrode according to claim 15, wherein the inorganic solid particles comprise at least one kind of particles selected from the group consisting of:
    particles of $Li_{5+m}A_mLa_{3-m}M4_2O_{12}$, wherein A is at least one selected from the group consisting of Ca, Sr, and Ba; M4 is at least one of Nb and Ta; m is within the range of $0 \leq m \leq 1.5$;

particles of $Li_3M5_{2-n}L_2O_{12}$, wherein M5 is at least one of Ta and Nb; L is Zr; n is within the range of $0 \leq n \leq 0.5$;

particles of $Li_{7-3p}Al_pLa_3Zr_3O_{12}$, where $0 \leq p \leq 0.3$; and particles of $Li_7La_3Zr_2O_{12}$.

17. The electrode according to claim 2, wherein a ratio $D_i/D_a$ of the average particle size is from 0.0001 to 0.5, wherein $D_i$ is the average particle size of the insulator particles and $D_a$ is the average particle size of the active material particles.

18. The electrode according to claim 2, wherein a ratio $D_i/D_a$ of the average particle size is from 0.01 to 0.2, wherein $D_i$ is the average particle size of the insulator particles and $D_a$ is the average particle size of the active material particles.

19. The electrode according to claim 1, wherein the active material-containing layer has a gradient of the volume ratio of the insulator particles.

* * * * *